(12) United States Patent
Usuda

(10) Patent No.: US 11,251,440 B2
(45) Date of Patent: Feb. 15, 2022

(54) FUEL CELL STACK

(71) Applicant: NISSAN MOTOR CO., LTD., Yokohama (JP)

(72) Inventor: Masahiro Usuda, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 19 days.

(21) Appl. No.: 16/636,755

(22) PCT Filed: Aug. 10, 2017

(86) PCT No.: PCT/JP2017/029209
§ 371 (c)(1),
(2) Date: Feb. 5, 2020

(87) PCT Pub. No.: WO2019/030921
PCT Pub. Date: Feb. 14, 2019

(65) Prior Publication Data
US 2020/0220181 A1    Jul. 9, 2020

(51) Int. Cl.
*H01M 8/0273* (2016.01)
*H01M 8/0258* (2016.01)
*H01M 8/2485* (2016.01)

(52) U.S. Cl.
CPC ....... *H01M 8/0273* (2013.01); *H01M 8/0258* (2013.01); *H01M 8/2485* (2013.01)

(58) Field of Classification Search
CPC ............ H01M 8/0273; H01M 8/0258; H01M 8/2485
See application file for complete search history.

(56) References Cited

U.S. PATENT DOCUMENTS

| | | |
|---|---|---|
| 6,593,020 B1 | 7/2003 | Yoo et al. |
| 8,383,284 B2 | 2/2013 | Selcuk et al. |
| 2003/0175573 A1 | 9/2003 | Yoo et al. |
| 2006/0127736 A1 | 6/2006 | Koch et al. |
| 2007/0243441 A1 | 10/2007 | Tsunoda |
| 2011/0229791 A1* | 9/2011 | Kageyama ............ C23C 28/322 429/469 |

(Continued)

FOREIGN PATENT DOCUMENTS

| | | |
|---|---|---|
| EP | 1035610 A2 | 9/2000 |
| JP | 2005-294180 A | 10/2005 |

(Continued)

*Primary Examiner* — Olatunji A Godo
(74) *Attorney, Agent, or Firm* — Foley & Lardner LLP

(57) ABSTRACT

A fuel cell stack in which cell units are stacked one on top of another, each of the cell units including: a power generation cell; and a separator defining and forming a flow passage portion, being a flow path of the gas, between the separator and the power generation cell, includes a frame body having an insulating property and arranged between at least one set of the cell units adjacent to each other. The frame body includes: as viewed in a stacking direction, outer peripheral beam portions provided to surround an outer peripheral side of a region in which the power generation cell is arranged; a connection beam portion connecting the outer peripheral beam portions to each other; and sealing beam portions formed along sealing portions at least partially sealing a manifold portion through which the gas is allowed to flow to the separator.

10 Claims, 25 Drawing Sheets

(56) References Cited

U.S. PATENT DOCUMENTS

2012/0107714 A1  5/2012  Day et al.
2016/0308225 A1  10/2016 Noponen et al.
2018/0019482 A1  1/2018  Noponen et al.

FOREIGN PATENT DOCUMENTS

| JP | 2006-318863 A | 11/2006 |
| JP | 4331790 B2 | 9/2009 |
| JP | 2012-104237 A | 5/2012 |
| JP | 2015-109225 A | 6/2015 |
| JP | 2016-126893 A | 7/2016 |
| JP | 2017-501545 A | 1/2017 |
| WO | WO 2004/061338 A1 | 7/2004 |
| WO | WO 2016/034856 A1 | 3/2016 |
| WO | WO-2017/040625 A1 | 3/2017 |

* cited by examiner

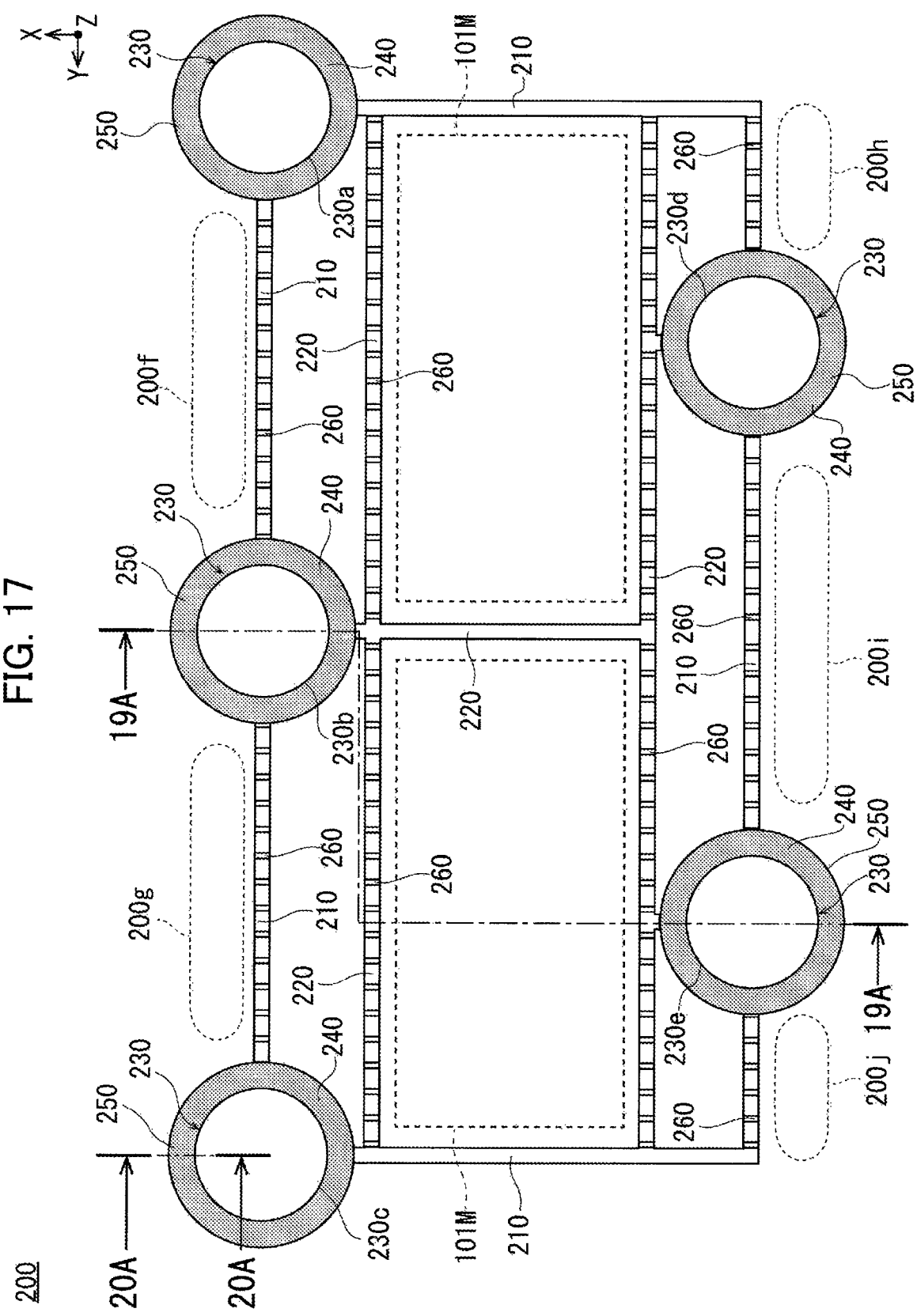

FUEL CELL STACK

TECHNICAL FIELD

The present invention relates to a fuel cell stack.

BACKGROUND ART

A fuel cell stack is a stacked body formed by stacking multiple cell units one on top of another, the cell units each including a power generation cell which generates power by using supplied gas and a separator which defines and forms a flow passage portion, being a flow path of the gas, between itself and the power generation cell.

The fuel cell stack, for example, for use as a power source of a vehicle, is required to have vibration resistance performance against input of vibration in traveling. When the stacking load is excessively increased to improve the vibration resistance performance of the fuel cell stack, there is a risk that creep deformation occurs in a metal member such as the separator after a lapse of long time and the member cannot maintain its function.

In view of the aforementioned problem, the fuel cell stack disclosed in Patent Literature 1 listed below is configured such that a gasket is arranged on the outer peripheral side of the power generation cell and the stacking load is applied only to the gasket. This suppresses application of excessive stacking load to the power generation cell and the separator.

CITATION LIST

Patent Literature

Patent Literature 1: Japanese Patent No. 4331790

SUMMARY OF INVENTION

Technical Problem

However, in the aforementioned configuration described in Patent Literature 1, stacking load is locally applied to the gasket. Accordingly, creep deformation may occur in the gasket after a lapse of long time. The vibration resistance performance of the fuel cell stack thereby decreases.

An object of the present invention is to provide a fuel cell stack which can improve vibration resistance performance.

Solution to Problem

A fuel cell stack according to the present invention for achieving the above object is a fuel cell stack in which cell units are stacked one on top of another, each of the cell units including: a power generation cell including an electrolyte held between a pair of electrodes from opposite sides and configured to generate power by using supplied gas; and a separator defining and forming a flow passage portion, being a flow path of the gas, between the separator and the power generation cell. The fuel cell stack includes a frame body having an insulating property and arranged between at least one set of the cell units adjacent to each other. The frame body includes, as viewed in a stacking direction, outer peripheral beam portions provided to surround an outer peripheral side of a region in which the power generation cell is arranged, a connection beam portion connected to the outer peripheral beam portions, manifold portions through which the gas is allowed to flow, sealing portions at least partially sealing peripheries of the manifold portions and limiting flows of the gas, and sealing beam portions formed along the sealing portions.

BRIEF DESCRIPTION OF DRAWINGS

FIG. 17 is an upper view illustrating one of the frame bodies of FIGS. 5 to 7.

DESCRIPTION OF EMBODIMENTS

Figure 1:
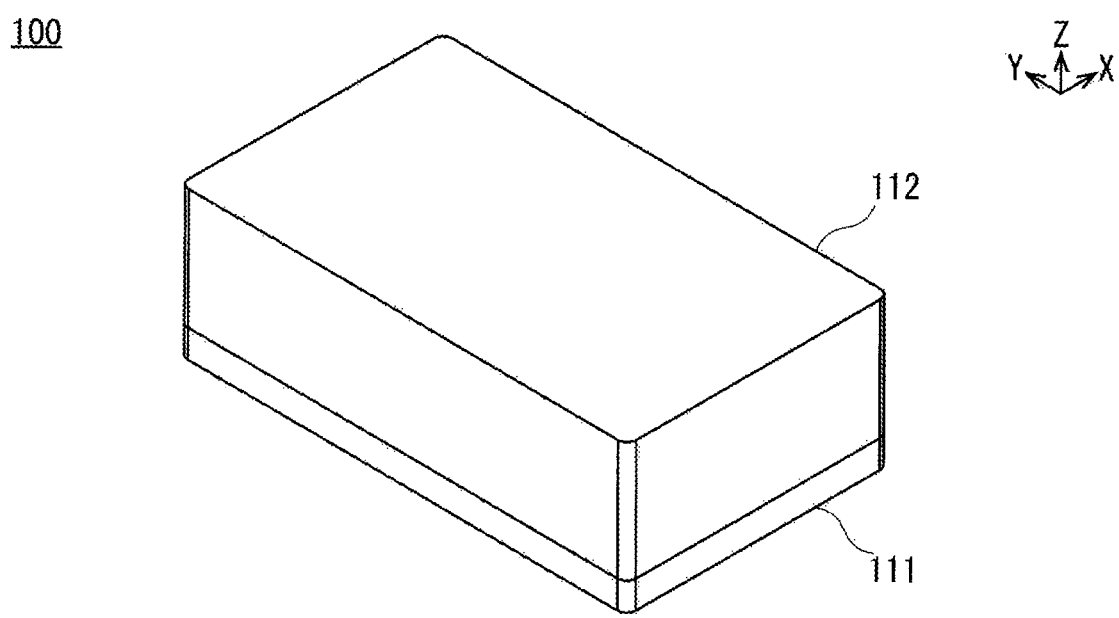
FIG. 1 is a perspective view illustrating a fuel cell stack of an embodiment.

An embodiment of the present invention is described below with reference to the attached drawings. Note that the following description does not limit the technical scope described in the claims and the definition of the terms. Moreover, the dimensional proportions in the drawings may be exaggerated for the sake of description and be different from the actual proportions.

Directions in the members forming a fuel cell stack are described by using arrows denoted by X, Y, and Z in the drawings. The direction of the arrow denoted by X indicates a short-side direction X of the fuel cell stack. The direction of the arrow denoted by Y indicates a long-side direction Y of the fuel cell stack. The direction of the arrow denoted by Z indicates a stacking (height) direction Z of the fuel cell stack.

(Configuration of Fuel Cell Stack 100)

Figure 2:
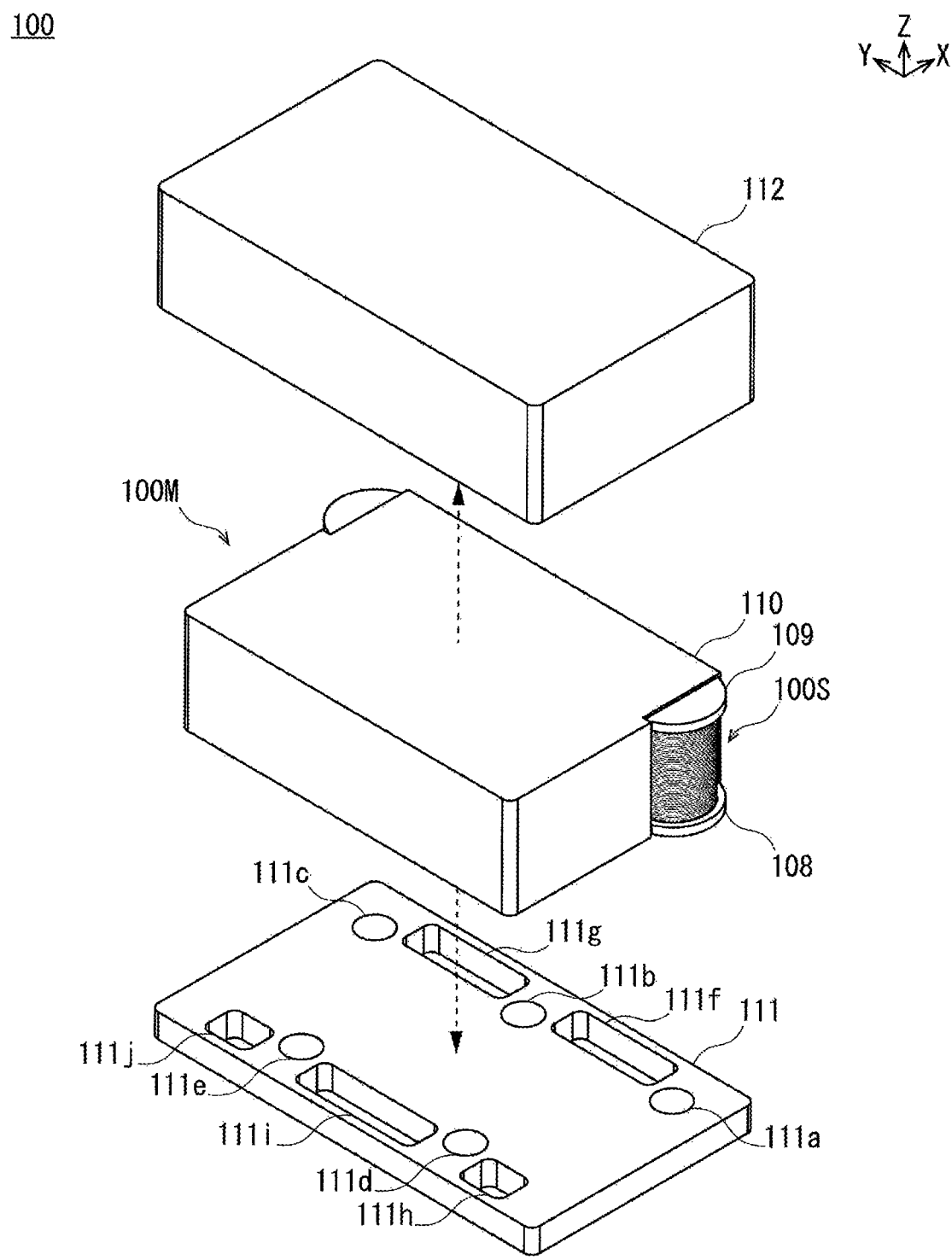
FIG. 2 is a perspective view illustrating a state where the fuel cell stack of FIG. 1 is disassembled into a cover, a cell stack assembly, and an external manifold.
Figure 3:
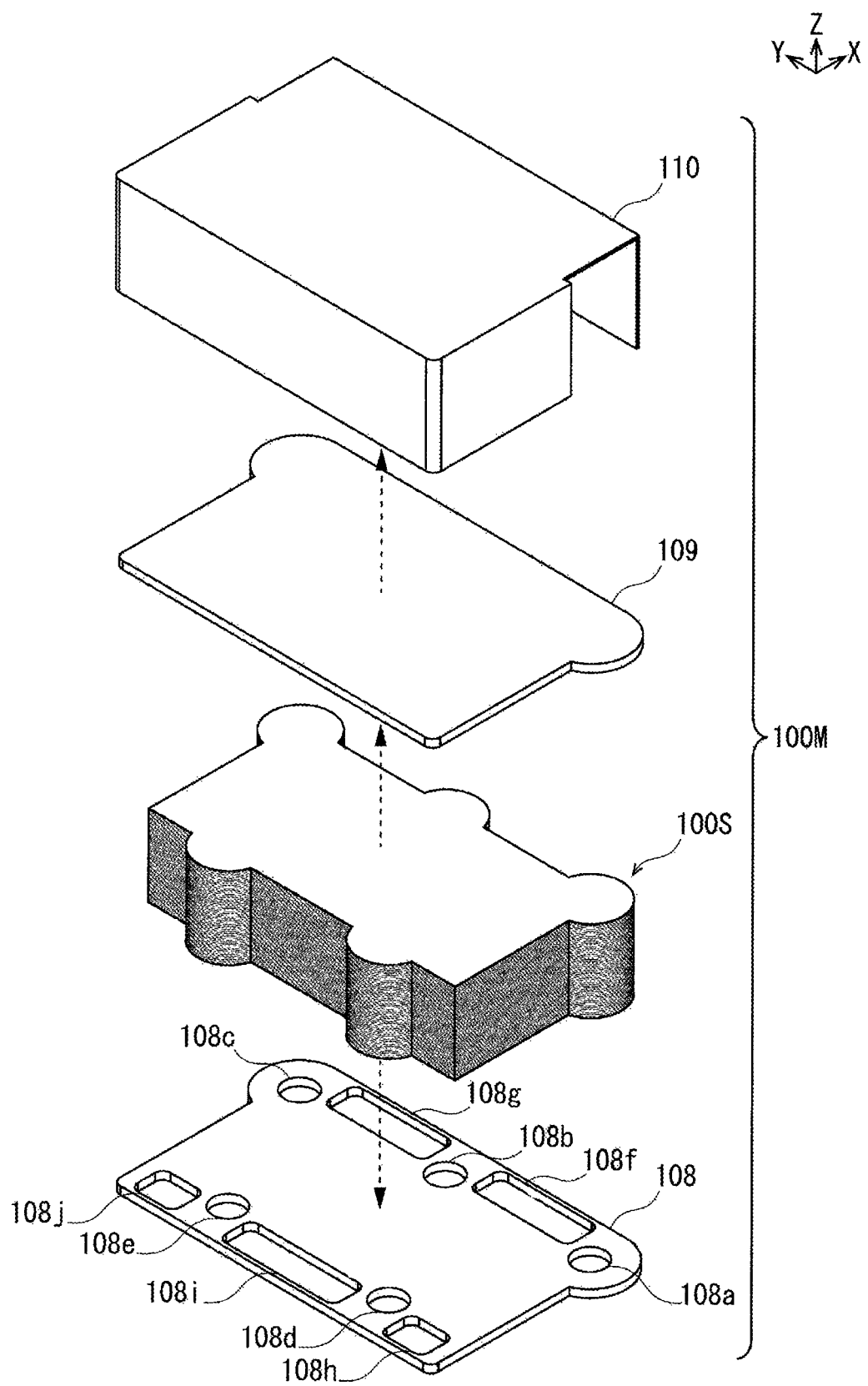
FIG. 3 is a perspective view illustrating a state where the cell stack assembly of FIG. 2 is disassembled into an air shelter, an upper end plate, a stack, and a lower end plate.
Figure 4:
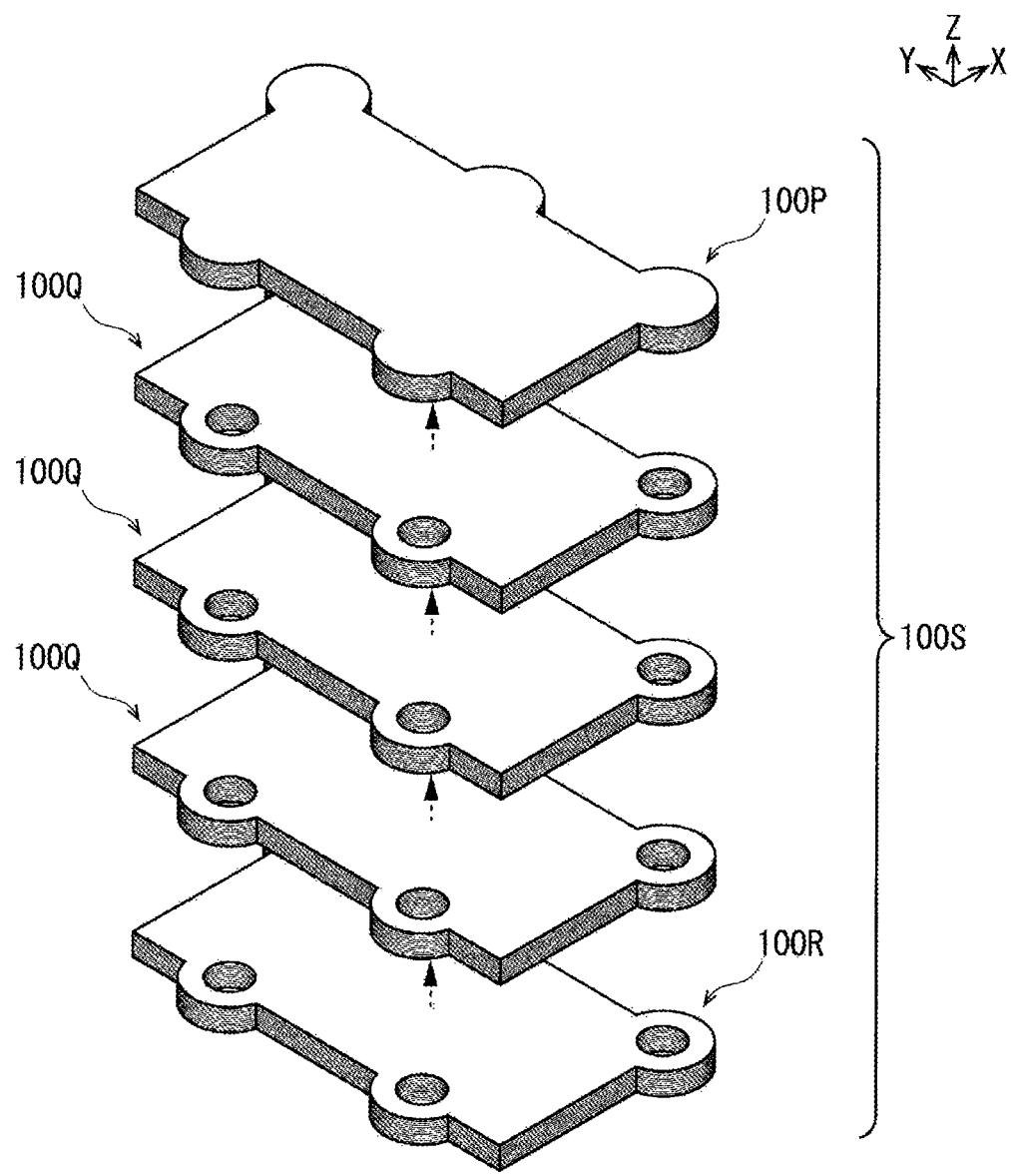
FIG. 4 is a perspective view illustrating a state where the stack of FIG. 3 is disassembled into an upper module unit, multiple middle module units, and a lower module unit.
Figure 5:
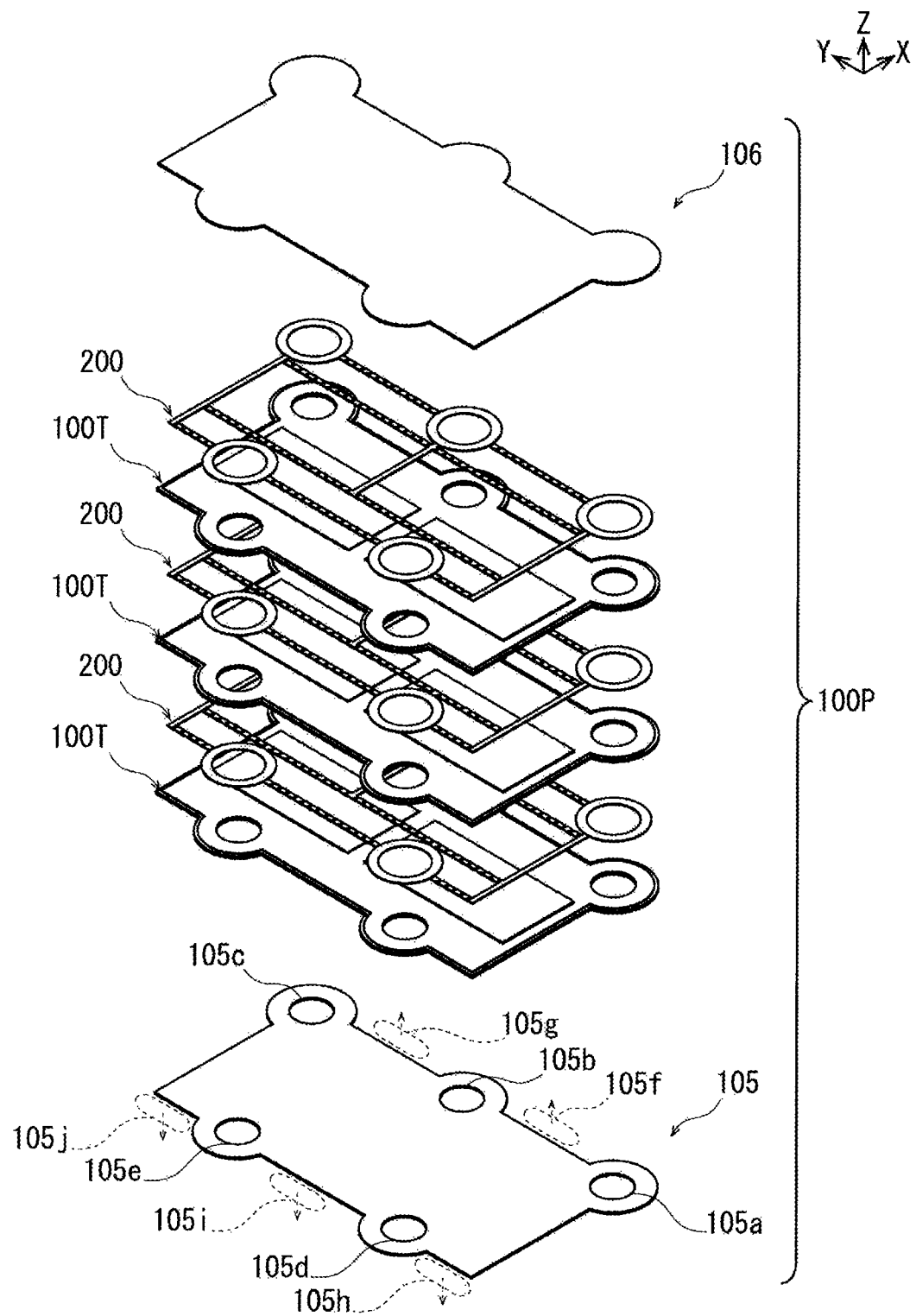
FIG. 5 is a perspective view illustrating the upper module unit of FIG. 4 in a disassembled state.
Figure 6:
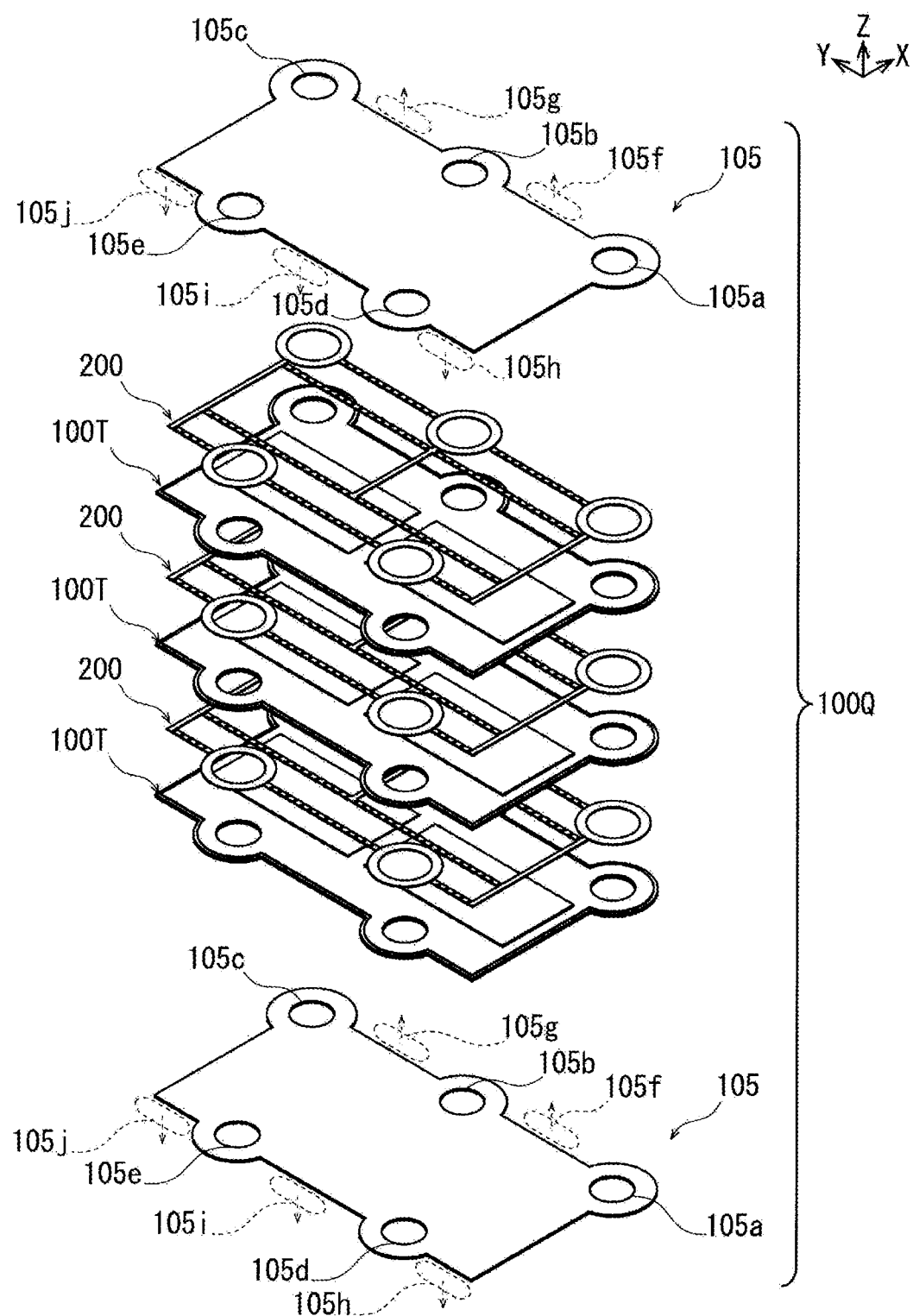
FIG. 6 is a perspective view illustrating one of the middle module units of FIG. 4 in a disassembled state.
Figure 7:
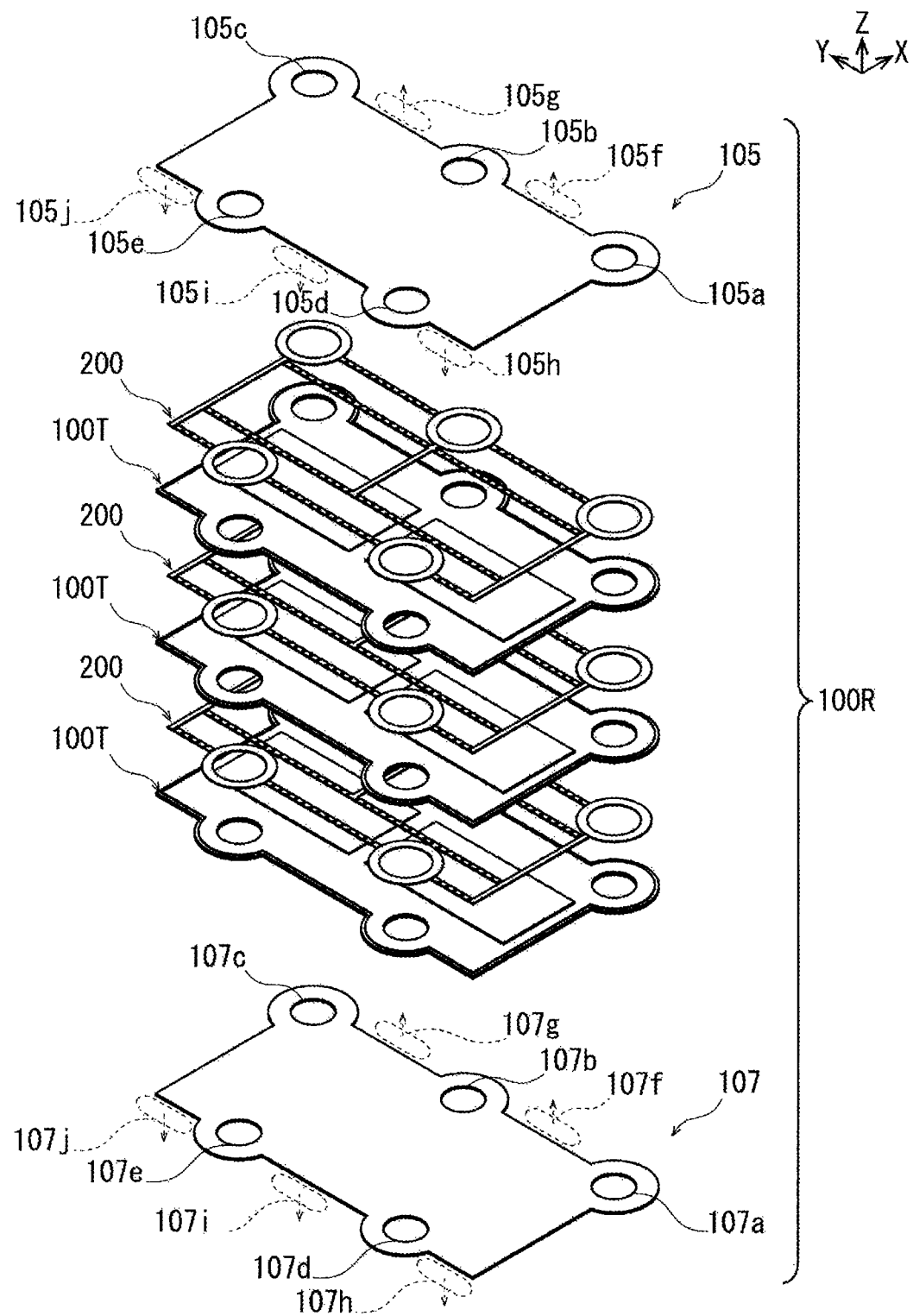
FIG. 7 is a perspective view illustrating the lower module unit of FIG. 4 in a disassembled state.
Figure 8:
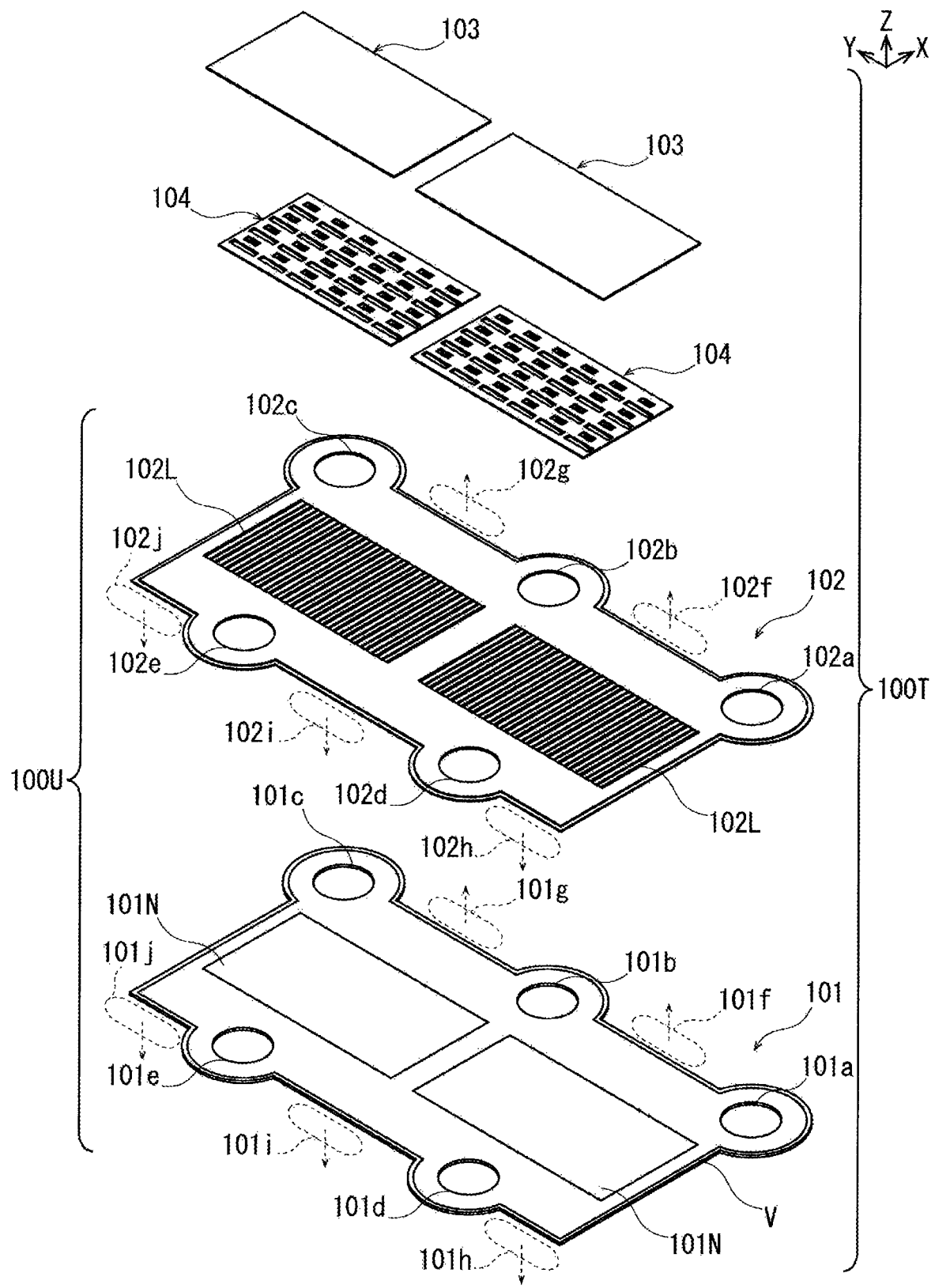
FIG. 8 is a perspective view illustrating one of cell units of FIGS. 5 to 7 in a disassembled state.

FIG. 1 is a perspective view illustrating the fuel cell stack 100 of a first embodiment. FIG. 2 is a perspective view illustrating a state where the fuel cell stack 100 of FIG. 1 is disassembled into a cover 112, a cell stack assembly 100M, and an external manifold 111. FIG. 3 is a perspective view illustrating a state where the cell stack assembly 100M of FIG. 2 is disassembled into an air shelter 110, an upper end plate 109, a stack 100S, and a lower end plate 108. FIG. 4 is a perspective view illustrating a state where the stack 100S of FIG. 3 is disassembled into an upper module unit 100P, multiple middle module units 100Q, and a lower module unit 100R. FIG. 5 is a perspective view illustrating the upper module unit 100P of FIG. 4 in a disassembled state. FIG. 6 is a perspective view illustrating one of the middle module units 100Q of FIG. 4 in a disassembled state. FIG. 7 is a perspective view illustrating the lower module unit 100R of FIG. 4 in a disassembled state. FIG. 8 is a perspective view illustrating one of cell units 100T of FIGS. 5 to 7 in a disassembled state.

Figure 9:
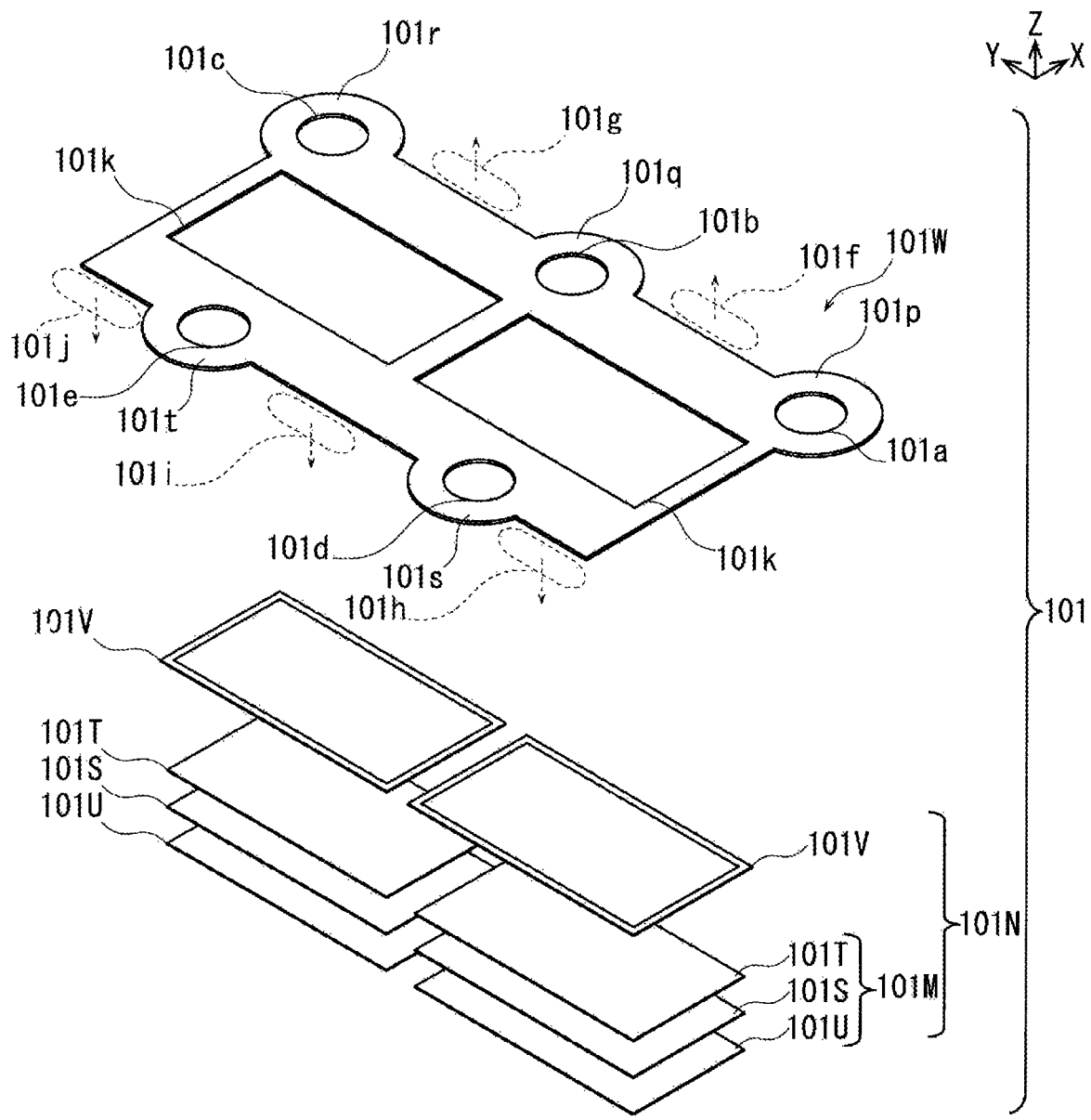
FIG. 9 is a perspective view illustrating a metal-supported cell assembly of FIG. 8 in a disassembled state.
Figure 10:
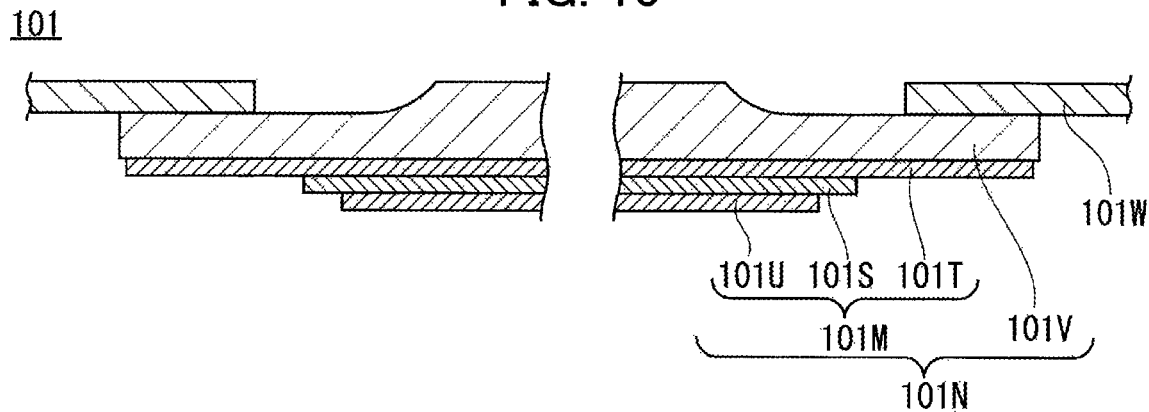
FIG. 10 is a cross-sectional view of the metal-supported cell assembly of FIG. 8.
Figure 11:
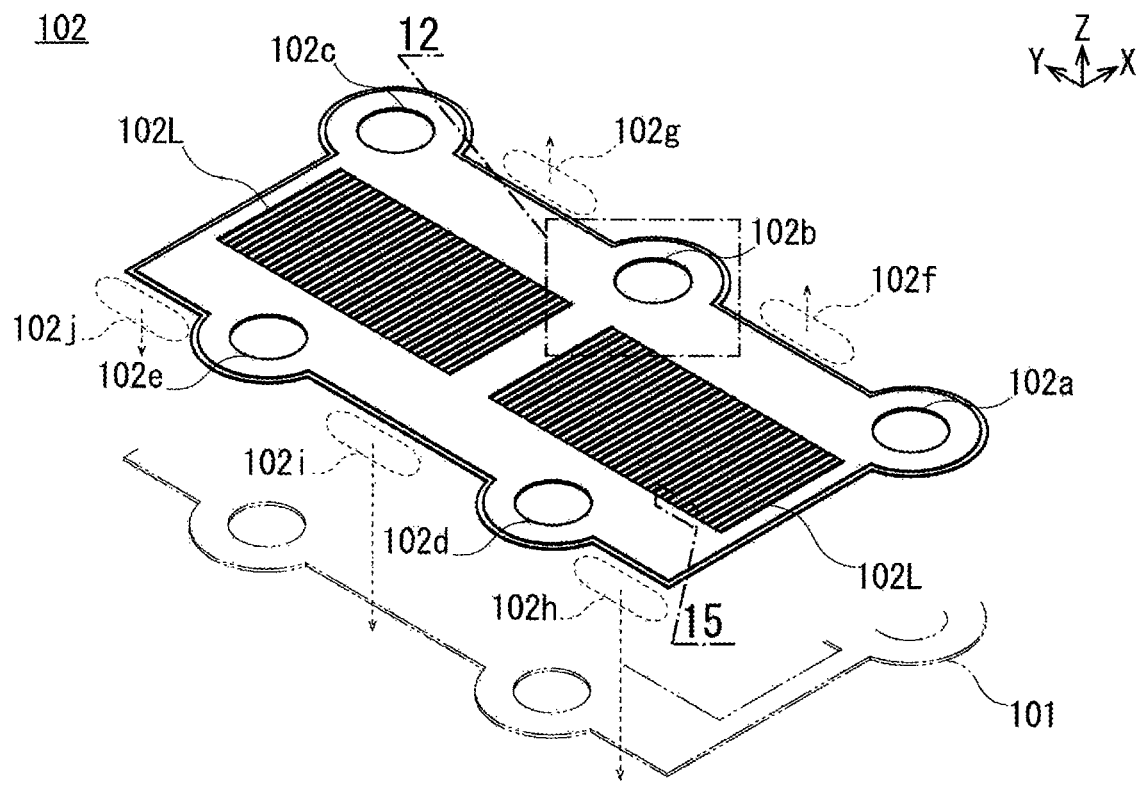
FIG. 11 is a perspective view illustrating a separator of FIG. 8 from the cathode side (illustrating the separator 102 as viewed from the upper side as in FIG. 8).
Figure 12:
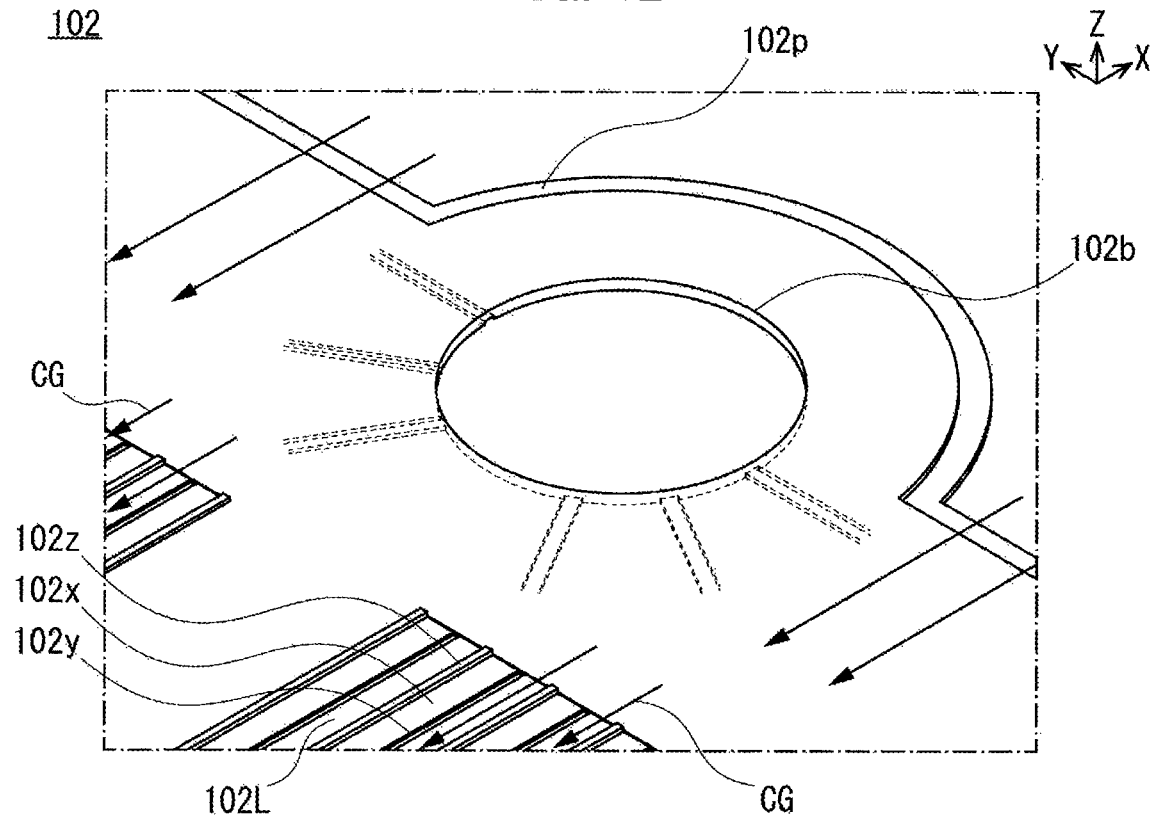
FIG. 12 is a perspective view illustrating a portion (region 12 in FIG. 11) of the separator of FIG. 11.
Figure 13:
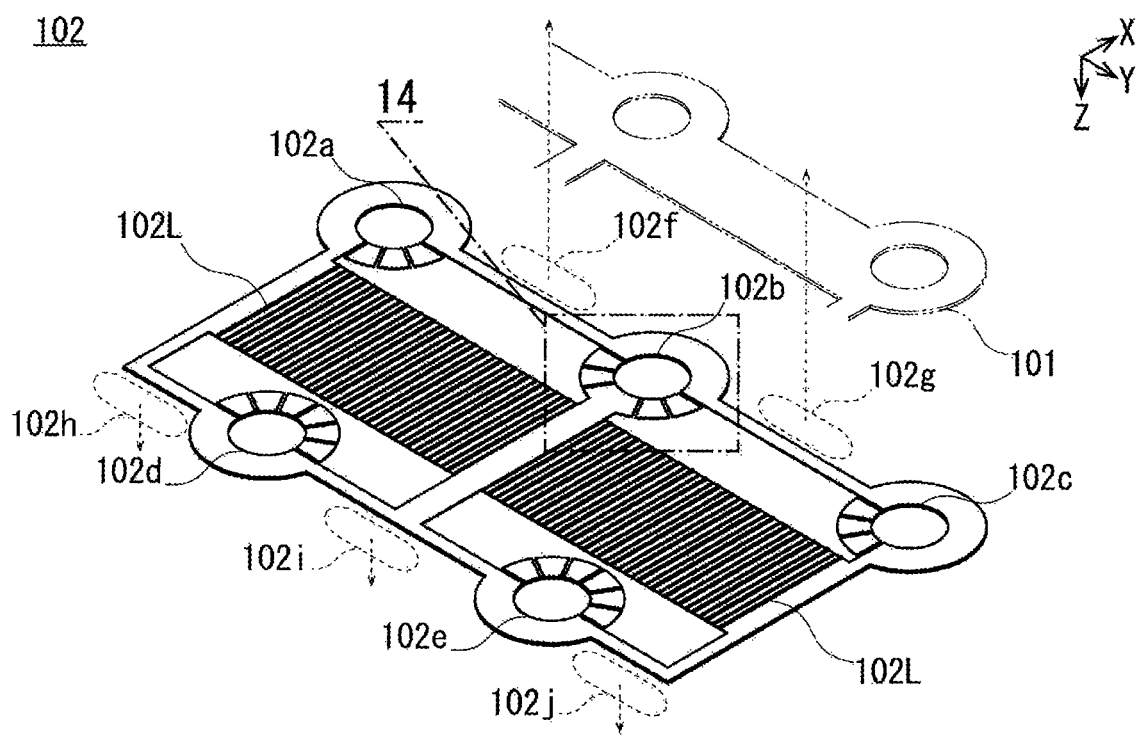
FIG. 13 is a perspective view illustrating the separator of FIG. 8 from the anode side (illustrating the separator 102 as viewed from the lower side as different from FIG. 8).
Figure 14:
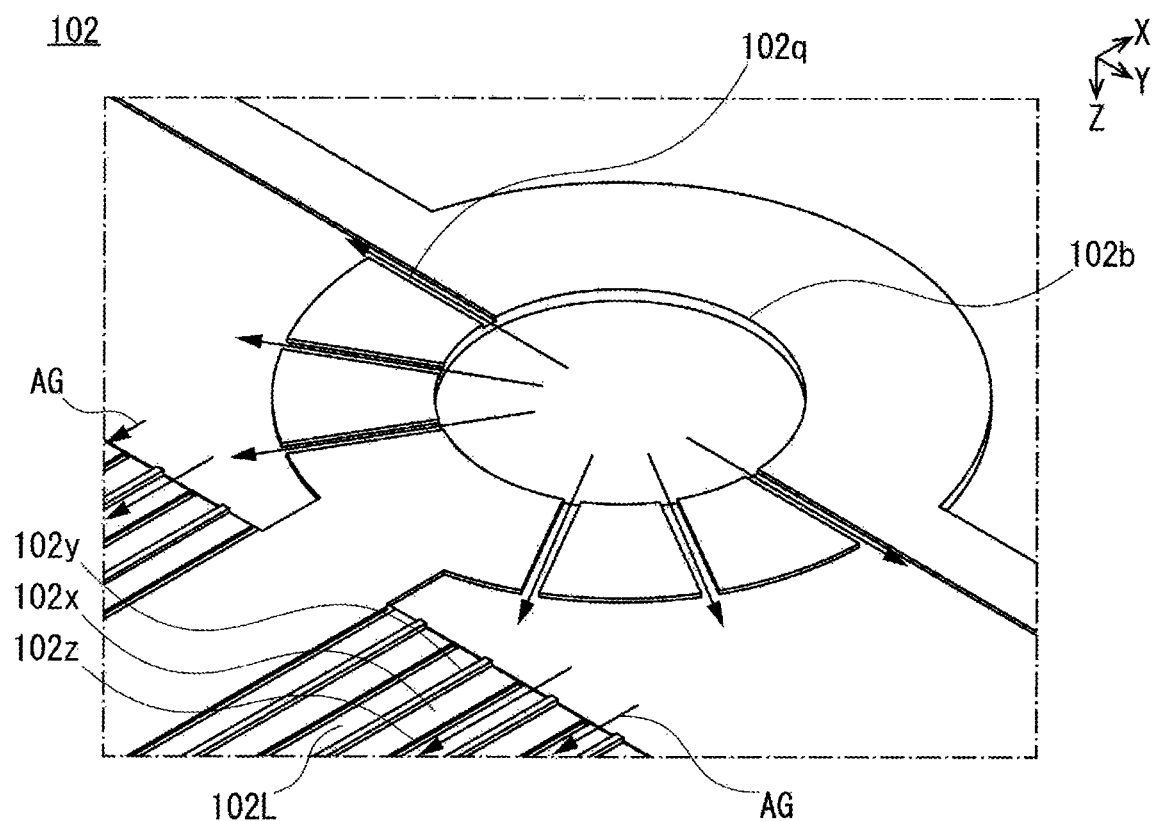
FIG. 14 is a perspective view illustrating a portion (region 14 in FIG. 13) of the separator of FIG. 13.
Figure 15:
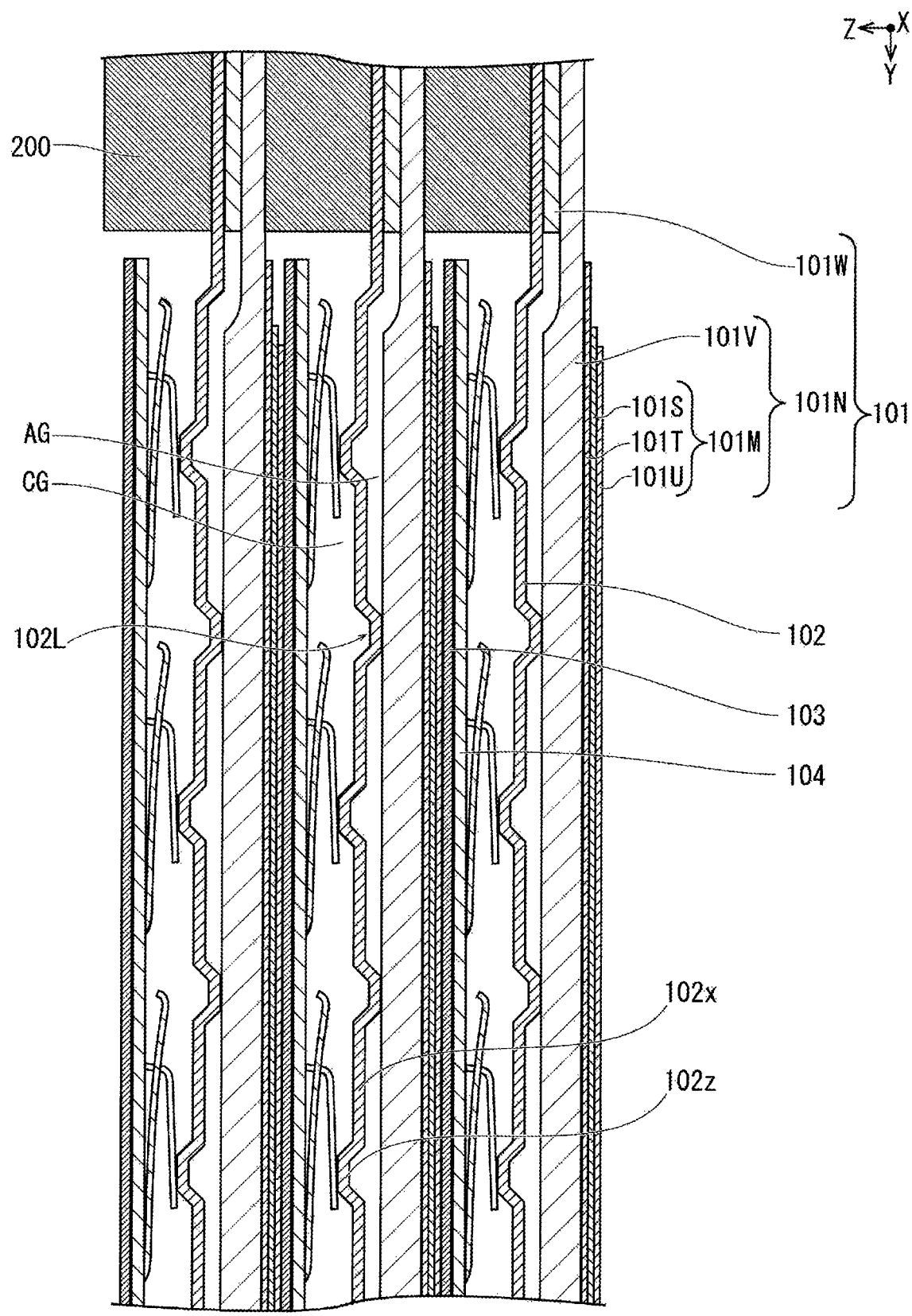
FIG. 15 is a cross-sectional view illustrating a portion (region 15 in FIG. 11) of the fuel cell stack in a state where the metal-supported cell assemblies, the separators, spring members, and current collection assisting layers of FIG. 8 are stacked one on top of another.
Figure 16A:
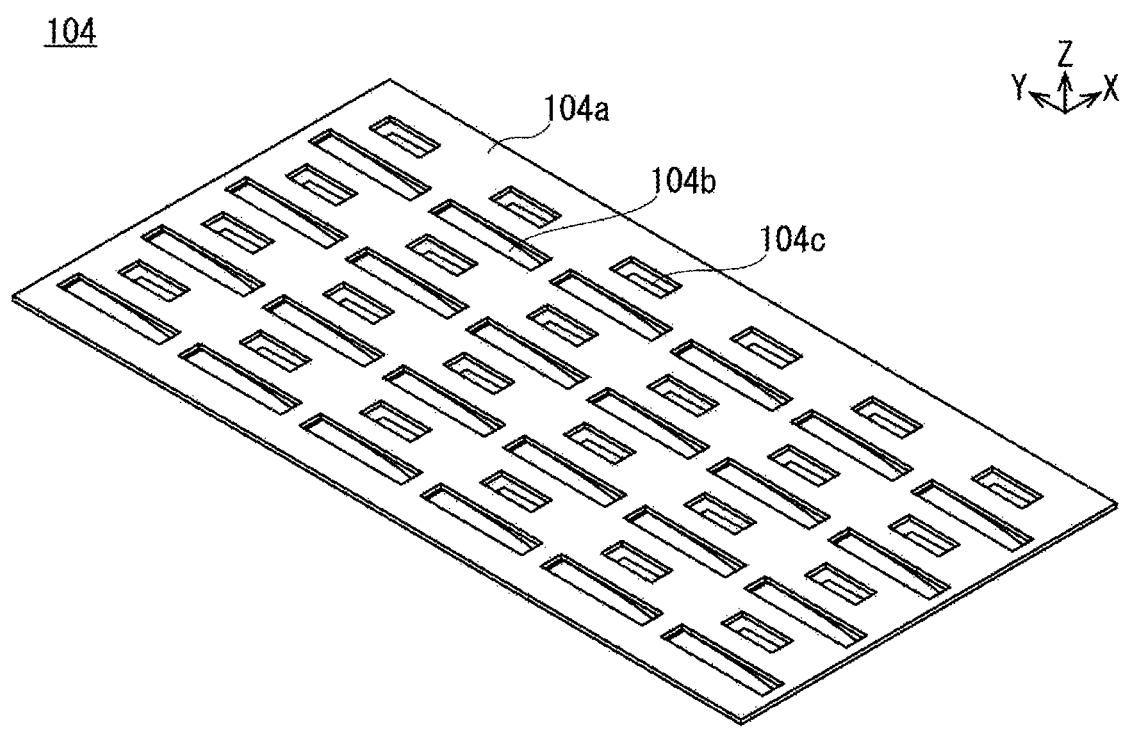
FIG. 16A is a perspective view of the spring member of FIG. 8 as viewed from the upper side.
Figure 16B:
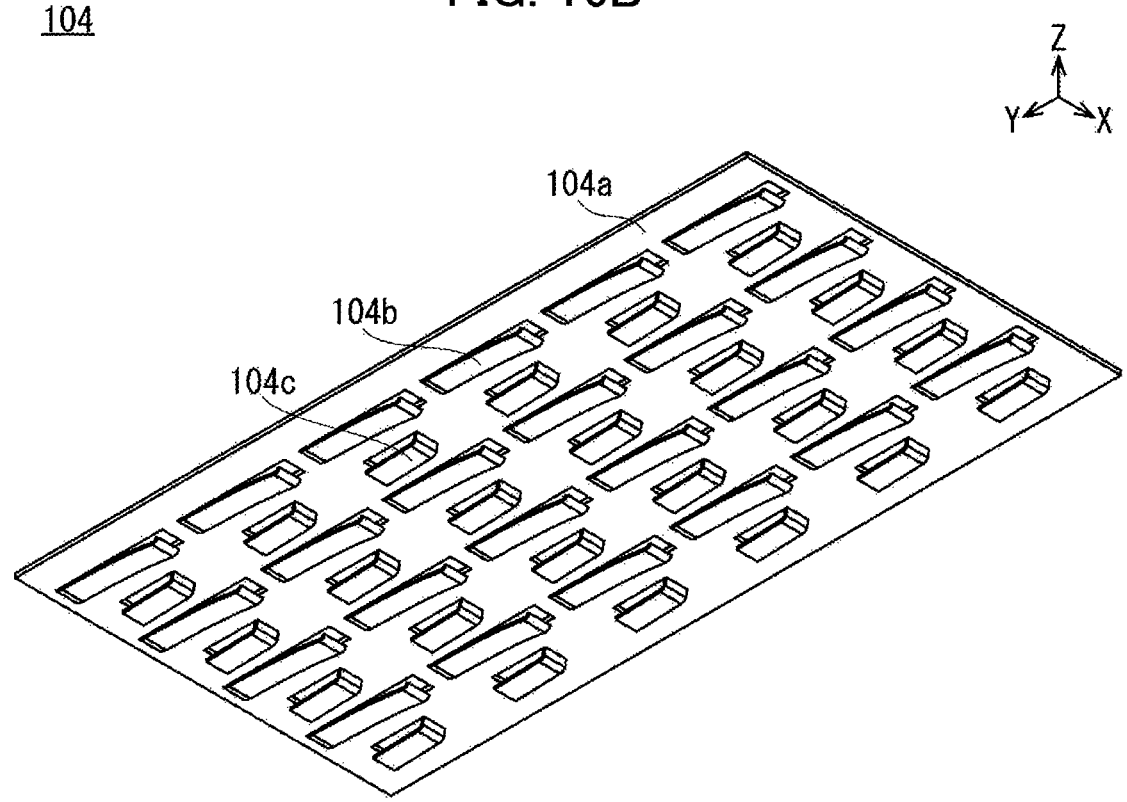
FIG. 16B is a perspective view of the spring member of FIG. 8 as viewed from the lower side.

FIG. 9 is a perspective view illustrating a metal-supported cell assembly 101 of FIG. 8 in a disassembled state. FIG. 10 is a cross-sectional view of a metal-supported cell assembly 101 of FIG. 8. FIG. 11 is a perspective view illustrating a separator 102 of FIG. 8 from the cathode side (illustrating the separator 102 as viewed from the upper side as in FIG. 8). FIG. 12 is a perspective view illustrating a portion (region 12 in FIG. 11) of the separator 102 of FIG. 11. FIG. 13 is a perspective view illustrating the separator 102 of FIG. 8 from the anode side (illustrating the separator 102 as viewed from the lower side as different from FIG. 8). FIG. 14 is a perspective view illustrating a portion (region 14 in FIG. 13) of the separator 102 of FIG. 13. FIG. 15 is a cross-sectional view illustrating a portion (region 15 in FIG. 11) of the fuel cell stack 100 in a state where the metal-supported cell assemblies 101, the separators 102, and current collection assisting layers 103 of FIG. 8 are stacked one on top of another. FIG. 16A is a perspective view of a spring member of FIG. 8 as viewed from the upper side. FIG. 16B is a perspective view of the spring member of FIG. 8 as viewed from the lower side.

As illustrated in FIGS. 1 and 2, the fuel cell stack 100 is formed by sandwiching the cell stack assembly 100M between the external manifold 111 configured to supply gas from the outside and the cover 112 configured to protect the cell stack assembly 100M from the upper and lower sides.

As illustrated in FIG. 3, the cell stack assembly 100M is formed by sandwiching the stack 100S between the upper end plate 109 and the lower end plate 108 from the upper and lower sides and covering the stack 100S with the air shelter 110 configured to seal a cathode gas CG.

As illustrated in FIG. 4, the stack 100S is formed by stacking the upper module unit 100P, the multiple middle module units 100Q, and the lower module unit 100R.

As illustrated in FIG. 5, the upper module unit 100P includes the multiple cell units 100T stacked one on top of another, frame bodies 200 arranged between at least one set of the cell units 100T adjacent to each other in the stacking direction Z, and an upper current collection plate 106 and a module end 105 arranged to sandwich the cell units 100T and the frame bodies 200 from the upper and lower sides. The upper current collection plate 106 outputs power generated in the cell units 100T to the outside. The module end 105 corresponds to a so-called end plate.

As illustrated in FIG. 6, each middle module unit 100Q includes the multiple cell units 100T stacked one on top of another, the frame bodies 200 arranged between at least one set of the cell units 100T adjacent to each other in the stacking direction Z, and the paired module ends 105 arranged to sandwich the cell units 100T and the frame bodies 200 from the upper and lower sides.

As illustrated in FIG. 7, the lower module unit 100R includes the multiple cell units 100T stacked one on top of another, the frame bodies 200 arranged between at least one set of the cell units 100T adjacent to each other in the stacking direction Z, and the module end 105 and a lower current collection plate 107 arranged to sandwich the cell units 100T and the frame bodies 200 from the upper and lower sides. The lower current collection plate 107 outputs power generated in the cell units 100T to the outside.

As illustrated in FIG. 8, each cell unit 100T is formed by stacking the metal-supported cell assembly 101 which includes power generation cells 101M configured to generate power by using supplied gas, the separator 102 which defines and forms flow passage portions 102L, being flow paths of gas, between itself and the power generation cells 101M, spring members 104, and the current collection assisting layers 103 in this order. Outer edges of the metal-supported cell assembly 101 and the separator 102 are annularly joined along a joining line V and a joined body 100U is formed.

Configurations of the fuel cell stack 100 are described below.

As illustrated in FIGS. 9 and 10, the metal-supported cell assembly 101 is provided with the power generation cells 101M configured to generate power by using the supplied gas.

The metal-supported cell assembly 101 is formed of multiple (two in the embodiment) metal-supported cells 101N arranged side by side in the long-side direction Y and a cell frame 101W (corresponding to a holding member) holding peripheries of the multiple metal-supported cells 101N. In the cell frame 101W, multiple active areas formed by the multiple power generation cells 101M are arranged. Accordingly, the supplied gas can be evenly distributed to the active areas at an equal amount. Thus, the fuel cell stack 100 can sufficiently improve power generation efficiency.

Each metal-supported cell 101N is formed of the power generation cell 101M corresponding to the active area contributing to power generation and a support metal 101V supporting the power generation cell 101M from one side.

As illustrated in FIG. 9, each power generation cell 101M is formed by sandwiching an electrolyte 101S between an anode 101T and a cathode 101U which are paired electrodes, from opposite sides.

As illustrated in FIGS. 9 and 10, the electrolyte 101S allows oxide ions to pass through from the cathode 101U to the anode 101T. The electrolyte 101S allows oxide ions to pass through but does not allow gas and electrons to pass through. The electrolyte 101S is formed in a rectangular shape. For example, the electrolyte 101S is made of solid oxide ceramic such as stabilized zirconia containing yttrium, neodymium oxide, samarium, gadolinium, scandium, or the like in a solid solution state.

As illustrated in FIGS. 9 and 10, the anode 101T is a fuel electrode and causes an anode gas AG (for example, hydrogen) to react with oxide ions to generate oxide of the anode gas AG and take out electrons. The anode 101T is resistant to a reducing atmosphere, allows the anode gas AG to pass through, has high electrical conductivity, and has a catalyst effect of causing the anode gas AG to react with oxide ions. The anode 101T is formed in a rectangular shape larger than the electrolyte 101S. For example, the anode 101T is made of cemented carbide in which metal such as nickel and oxide ion conductor such as yttria-stabilized zirconia are mixed.

As illustrated in FIGS. 9 and 10, the cathode 101U is an oxidant electrode and causes the cathode gas CG (for example, oxygen included in air) to react with electrons to convert oxygen molecules into oxide ions. The cathode 101U is resistant to an oxidizing atmosphere, allows the cathode gas CG to pass through, has high electrical conductivity, and has a catalyst effect of converting oxygen molecules into oxide ions. The cathode 101U is formed in a rectangular shape smaller than the electrolyte 101S. For example, the cathode 101U is made of an oxide of lanthanum, strontium, manganese, cobalt, or the like.

As illustrated in FIGS. 9 and 10, the support metal 101V supports the power generation cell 101M from the anode 101T side. The support metal 101V has gas permeability, high electrical conductivity, and sufficient strength. The support metal 101V is formed in a rectangular shape sufficiently larger than the anode 101T. For example, the support metal 101V is made of stainless steel or corrosion resistant alloy or corrosion resistant steel containing nickel and chrome.

As illustrated in FIGS. 9 and 10, the cell frame 101W holds the peripheries of the metal-supported cells 101N. The cell frame 101W is formed in a thin rectangular shape. The cell frame 101W has two opening portions 101k arranged side by side in the long-side direction Y. Each of the two opening portions 101k of the cell frame 101W is a rectangular penetrating hole and is smaller than an outer shape of the support metal 101V. The cell frame 101W is made of metal and is insulated by using an insulator or coating. The insulator is formed by, for example, attaching aluminum oxide to the cell frame 101W. The metal-supported cell 101N is joined to the cell frame 101W by joining outer edges of the support metals 101V to inner edges of the opening portions 101k of the cell frame 101W.

As illustrated in FIGS. 9 and 10, the cell frame 101W is provided with circular extending portions (a first extending portion 101p, a second extending portion 101q, and a third extending portion 101r) extending in an in-plane direction of the cell frame 101W, respectively, from a right end, a center portion, and a left end of one side extending in the long-side direction Y. The cell frame 101W is provided with circular extending portions (a fourth extending portion 101s and a fifth extending portion 101t) extending in the in-plane direction of the cell frame 101W, respectively, from two portions of another side extending in the long-side direction Y which are away from the center of the other side. In the cell frame 101W, the first, second, and third extending portions 101p, 101q, and 101r and the fourth and fifth extending portions 101s and 101t are arranged alternately in the longitudinal direction Y across the two opening portions 101k.

As illustrated in FIG. 9, the cell frame 101W is provided with an anode side first flow-in port 101a, an anode side second flow-in port 101b, and an anode side third flow-in port 101c for passing (flow-in) of the anode gas AG respectively in the first extending portion 101p, the second extending portion 101q, and the third extending portion 101r. The cell frame 101W is provided with an anode side first flow-out port 101d and an anode side second flow-out port 101e for passing (flow-out) of the anode gas AG respectively in the fourth extending portion 101s and the fifth extending portion 101t. The flow-in ports 101a, 101b, 101c and the flow-out ports 101d, 101e of the anode gas AG are so-called manifold.

As illustrated in FIG. 9, the cell frame 101W is provided with a cathode side first flow-in port 101f for passing (flow-in) of the cathode gas CG in a space between the first extending portion 101p and the second extending portion 101q. The cell frame 101W is provided with a cathode side second flow-in port 101g for passing (flow-in) of the cathode gas CG in a space between the second extending portion 101q and the third extending portion 101r. The cell frame 101W is provided with a cathode side first flow-out port 101h for passing (flow-out) of the cathode gas CG on the right side of the fourth extending portion 101s in FIG. 9. The cell frame 101W is provided with a cathode side second flow-out port 101i for passing (flow-out) of the cathode gas CG in a space between the fourth extending portion 101s and the fifth extending portion 101t. The cell frame 101W is provided with a cathode side third flow-out port 101j for passing (flow-out) of the cathode gas CG on the left side of the fifth extending portion 101t in FIG. 9. In the cell frame 101W, the flow-in ports 101f, 101g and the flow-out ports 101h, 101i, 101j of the cathode gas CG correspond to spaces between an outer peripheral surface of the cell frame 101W and an inner surface of the air shelter 110.

As illustrated in FIG. 15, each separator 102 is provided between the power generation cell 101M of one metal-supported cell assembly 101 and the power generation cell 101M of another metal-supported cell assembly 101 which are adjacent to each other in the stacking direction Z.

The separator 102 is arranged to face the metal-supported cell assembly 101. The separator 102 has the same outer shape as the metal-supported cell assembly 101. The separator 102 is made of metal and is insulated by using an insulator or coating except for regions facing the power generation cells 101M (flow passage portions 102L). The insulator is formed by, for example, attaching aluminum oxide to the separator 102. In the separator 102, the flow passage portions 102L are provided side by side in the long-side direction Y to face the power generation cells 101M.

In the separator 102, as illustrated in FIGS. 8, 11 to 15, each flow passage portion 102L is formed by arranging flow passages, extending in a direction (short-side direction X) of gas flow, side by side in a direction (long-side direction Y) orthogonal to the direction (short-side direction X) of gas flow. As illustrated in FIGS. 12, 14 and 15, in each flow passage portion 102L, protrusion-shaped anode side projections 102y are provided at fixed intervals to protrude downward from a flat portion 102x being flat in a plane extending in the long-side direction Y and the short-side direction X. The anode side projections 102y extend in the direction (short-side direction X) of gas flow. The anode side projections 102y protrude downward from a lower end of the separator 102. As illustrated in FIGS. 12, 14 and 15, in each flow passage portion 102L, protrusion-shaped cathode side projections 102z are provided at fixed intervals to protrude upward from the flat portion 102x. The cathode side projections 102z extend in the direction (short-side direction X) of gas flow. The cathode side projections 102z protrude upward from an upper end of the separator 102. In each flow passage portion 102L, the anode side projections 102y and the protrusion-shape cathode side projections 102z are provided alternately in the long-side direction Y with the flat portion 102x therebetween.

In the separator 102, as illustrated in FIG. 15, gaps between the flow passage portions 102L and the metal-supported cell assembly 101 located below (right side in FIG. 15) the flow passage portions 102L are formed as flow passages of the anode gas AG. The anode gas AG flows from an anode side second flow-in port 102b and the like of the separator 102 illustrated in FIG. 13 into the flow passage portions 102L on the anode side through multiple grooves 102q illustrated in FIGS. 13 and 14. In the separator 102, as illustrated in FIGS. 13 and 14, the multiple grooves 102q are formed to radially extend from an anode side first flow-in port 102a, the anode side second flow-in port 102b, and an anode side third flow-in port 102c toward the flow passage portions 102L on the anode side. In the separator 102, as illustrated in FIGS. 12 and 15, gaps between the flow passage portions 102L and the metal-supported cell assembly 101 located above (left side in FIG. 15) the flow passage portions 102L are formed as flow passages of the cathode gas CG.

As illustrated in FIG. 12, in the separator 102, an outer edge 102p is formed to be thinner than other portions. The cathode gas CG flows from a cathode side first flow-in port 102f and a cathode side second flow-in port 102g of the separator 102 illustrated in FIG. 11 into the flow passage portions 102L on the cathode side by crossing the outer edge 102p of the separator 102 on the cathode side illustrated in FIGS. 11 and 12.

As illustrated in FIGS. 8, 11, and 13, in the separator 102, the anode side first flow-in port 102a, the anode side second flow-in port 102b, the anode side third flow-in port 102c, an anode side first flow-out port 102d, and an anode side second flow-out port 102e for passing of the anode gas AG are provided to be aligned relative to the metal-supported cell assembly 101 in the stacking direction Z. In the separator 102, the cathode side first flow-in port 102f, the cathode side second flow-in port 102g, a cathode side first flow-out port 102h, a cathode side second flow-out port 102i, and a cathode side third flow-out port 102j for passing of the cathode gas CG are provided to be aligned relative to the metal-supported cell assembly 101 in the stacking direction Z. The flow-in ports 102f, 102g and the flow-out ports 102h, 102i, 102j of the cathode gas CG correspond to spaces between an outer peripheral surface of the separator 102 and the inner surface of the air shelter 110.

Each current collection assisting layer 103 is arranged between the power generation cell 101M and the separator 102 to form a space allowing the gas to flow while making the surface pressure even and assists an electrical contact between the power generation cell 101M and the separator 102. The current collection assisting layer 103 is so-called expanded metal.

The current collection assisting layer 103 is arranged between the power generation cell 101M and the flow passage portion 102L of the separator 102. The current collection assisting layer 103 has the same outer shape as the power generation cell 101M. The current collection assisting layer 103 has a metal mesh shape provided with openings of a rhombic shape or the like arranged in a lattice pattern.

As illustrated in FIG. 15, each spring member 104 is provided between the current collection assisting layer 103 and the separator 102 and presses the current collection assisting layer 103 against the power generation cell 101M to bring the power generation cell 101M and the current collection assisting layer 103 into contact with each other with sufficient surface pressure.

As illustrated in FIGS. 16A and 16B, the spring member 104 includes a flat base plate 104a and multiple elastically-deformable first protruding pieces 104b and second protruding pieces 104c formed by being made to stand up from the base plate 104a as cantilevers. The first protruding pieces 104b and the second protruding pieces 104c are alternately arranged such that a standing direction of the first protruding pieces 104b is opposite to that of the second protruding pieces 104c in the long-side direction Y. Note that, although the first protruding pieces 104b and the second protruding pieces 104c illustrated in FIGS. 16A and 16B have quadrilateral shapes, the shapes thereof are not limited to particular shapes.

As illustrated in FIGS. 5 to 7, each module end 105 is a plate which holds a lower end or an upper end of the multiple cell units 100T stacked one on top of another.

The module end 105 is arranged at the lower end or the upper end of the multiple cell units 100T stacked one on top of another. The module end 105 has the same outer shape as the cell units 100T. The module end 105 is made of an electrically-conductive material which does not allow gas to pass through and is insulated by using an insulator or coating except for regions facing the power generation cells 101M and the other module end 105. The insulator is formed by, for example, attaching aluminum oxide to the module end 105.

In the module end 105, an anode side first flow-in port 105a, an anode side second flow-in port 105b, an anode side third flow-in port 105c, an anode side first flow-out port 105d, and an anode side second flow-out port 105e for passing of the anode gas AG are provided to be aligned relative to the cell units 100T in the stacking direction Z. In the module end 105, a cathode side first flow-in port 105f, a cathode side second flow-in port 105g, a cathode side first flow-out port 105h, a cathode side second flow-out port 105i, and a cathode side third flow-out port 105j for passing of the cathode gas CG are provided to be aligned relative to the cell units 100T in the stacking direction Z. In the module end 105, the flow-in ports 105f, 105g and the flow-out ports 105h, 105i, 105j of the cathode gas CG correspond to spaces between an outer peripheral surface of the module end 105 and the inner surface of the air shelter 110.

The upper current collection plate 106 outputs power generated in the cell units 100T to the outside.

As illustrated in FIG. 5, the upper current collection plate 106 is arranged at an upper end of the upper module unit 100P. The upper current collection plate 106 has the same outer shape as the cell units 100T. The upper current collection plate 106 is provided with a terminal (not illustrated) to be connected to an external current carrying member. The upper current collection plate 106 is made of an electrically-conductive material which does not allow gas to pass through and is insulated by using an insulator or coating except for a portion of the terminal and regions facing the power generation cells 101M of the cell unit 100T. The insulator is formed by, for example, attaching aluminum oxide to the upper current collection plate 106.

The lower current collection plate 107 outputs power generated in the cell units 100T to the outside.

As illustrated in FIG. 7, the lower current collection plate 107 is arranged at a lower end of the lower module unit 100R. The lower current collection plate 107 has the same outer shape as the upper current collection plate 106. The lower current collection plate 107 is provided with a terminal (not illustrated) to be connected to an external current carrying member. The lower current collection plate 107 is made of an electrically-conductive material which does not allow gas to pass through and is insulated by using an insulator or coating except for a portion of the terminal and regions facing the power generation cells 101M of the cell unit 100T. The insulator is formed by, for example, attaching aluminum oxide to the lower current collection plate 107.

In the lower current collection plate 107, an anode side first flow-in port 107a, an anode side second flow-in port 107b, an anode side third flow-in port 107c, an anode side first flow-out port 107d, and an anode side second flow-out port 107e for passing of the anode gas AG are provided to be aligned relative to the cell units 100T in the stacking direction Z. In the lower current collection plate 107, a cathode side first flow-in port 107f, a cathode side second flow-in port 107g, a cathode side first flow-out port 107h, a cathode side second flow-out port 107i, and a cathode side third flow-out port 107j for passing of the cathode gas CG are provided to be aligned relative to the cell units 100T in the stacking direction Z. In the lower current collection plate 107, the flow-in ports 107f, 107g and the flow-out ports 107h, 107i, 107j of the cathode gas CG correspond to spaces between an outer peripheral surface of the lower current collection plate 107 and the inner surface of the air shelter 110.

As illustrated in FIGS. 2 and 3, the lower end plate 108 holds the stack 100S from the lower side.

The lower end plate 108 is arranged at a lower end of the stack 100S. The lower end plate 108 has the same outer shape as the cell units 100T except for some portions. Both ends of the lower end plate 108 in the long-side direction Y are formed to extend linearly to form flow-in ports and discharge ports of the cathode gas CG. The lower end plate 108 is formed to be sufficiently thicker than the cell unit 100T. For example, the lower end plate 108 is made of metal and an upper surface to be in contact with the lower current collection plate 107 is insulated by using an insulator or coating. The insulator is formed by, for example, attaching aluminum oxide to the lower end plate 108.

In the lower end plate 108, an anode side first flow-in port 108a, an anode side second flow-in port 108b, an anode side third flow-in port 108c, an anode side first flow-out port 108d, and an anode side second flow-out port 108e for passing of the anode gas AG are provided to be aligned relative to the cell units 100T in the stacking direction Z. In the lower end plate 108, a cathode side first flow-in port 108f, a cathode side second flow-in port 108g, a cathode side first flow-out port 108h, a cathode side second flow-out port 108i, and a cathode side third flow-out port 108j for passing of the cathode gas CG are provided to be aligned relative to the cell units 100T in the stacking direction Z.

As illustrated in FIGS. 2 and 3, the upper end plate 109 holds the stack 100S from the upper side.

The upper end plate 109 is arranged at an upper end of the stack 100S. The upper end plate 109 has the same outer shape as the lower end plate 108. Unlike the lower end plate 108, the upper end plate 109 is provided with no flow-in ports or discharge ports of gas. For example, the upper end plate 109 is made of metal and a lower surface to be in contact with the upper current collection plate 106 is insulated by using an insulator or coating. The insulator is formed by, for example, attaching aluminum oxide to the upper end plate 109.

The air shelter 110 forms the flow passages of the cathode gas CG between itself and the stack 100S.

As illustrated in FIGS. 2 and 3, the air shelter 110 covers the stack 100S sandwiched between the lower end plate 108 and the upper end plate 109, from above. The air shelter 110 forms the flow-in ports and the flow-out ports of the cathode gas CG for the components of the stack 100S, by using gap portions between the inner surface of the air shelter 110 and a side surface of the stack 100S. The air shelter 110 is formed in a box shape and the entire lower portion and part of the side portion are opened. For example, the air shelter 110 is made of metal and the inner surface is insulated by using an insulator or coating. The insulator is formed by, for example, attaching aluminum oxide to the air shelter 110.

As illustrated in FIGS. 1 and 2, the external manifold 111 supplies gas from the outside to the multiple cell units 100T.

The external manifold 111 is arranged below the cell stack assembly 100M. The external manifold 111 has an outer shape obtained by simplifying the shape of the lower end plate 108. The external manifold 111 is formed to be sufficiently thicker than the lower end plate 108. For example, the external manifold 111 is made of metal.

In the external manifold 111, an anode side first flow-in port 111a, an anode side second flow-in port 111b, an anode side third flow-in port 111c, an anode side first flow-out port 111d, and an anode side second flow-out port 111e for passing of the anode gas AG are provided to be aligned relative to the cell units 100T in the stacking direction Z. In the external manifold 111, a cathode side first flow-in port 111f, a cathode side second flow-in port 111g, a cathode side first flow-out port 111h, a cathode side second flow-out port 111i, and a cathode side third flow-out port 111j for passing of the cathode gas CG are provided to be aligned relative to the cell units 100T in the stacking direction Z.

As illustrated in FIGS. 1 and 2, the cover 112 covers the cell stack assembly 100M to protect it.

The cover 112 and the external manifold 111 sandwich the cell stack assembly 100M from the upper and lower sides.

The cover 112 has a box shape and a lower portion thereof is opened. For example, the cover 112 is made of metal and an inner surface is insulated by an insulator.

(Frame Body 200)

The frame bodies 200 are described below in detail with reference to FIGS. 17 to 20B.

Figure 18A:
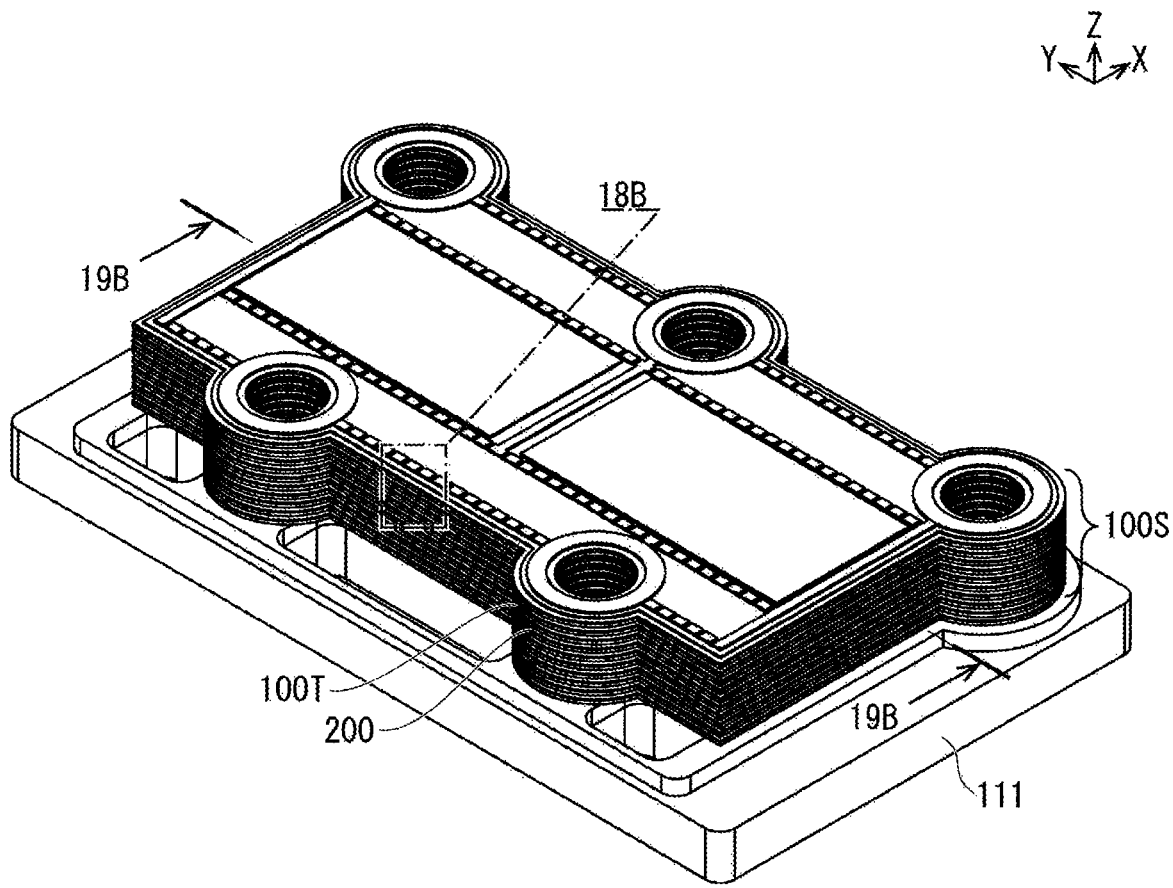
FIG. 18A is a perspective view illustrating a state in which the multiple cell units and the multiple frame bodies of FIGS. 5 to 7 are stacked.
Figure 18B:
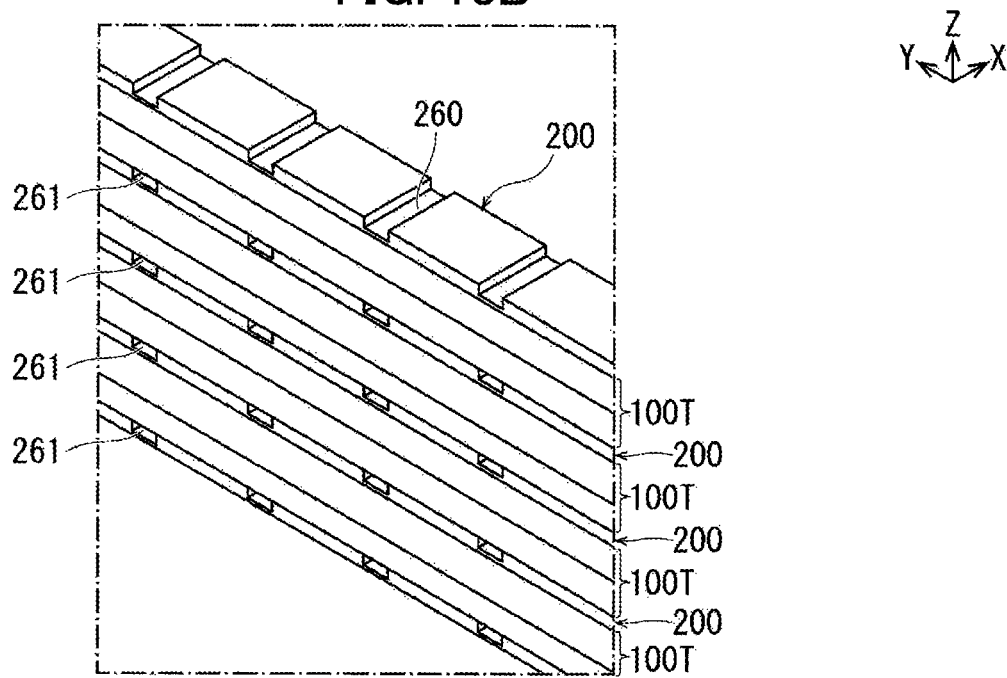
FIG. 18B is a perspective view illustrating a region 18B in FIG. 18A in an enlarged manner.
Figure 19A:
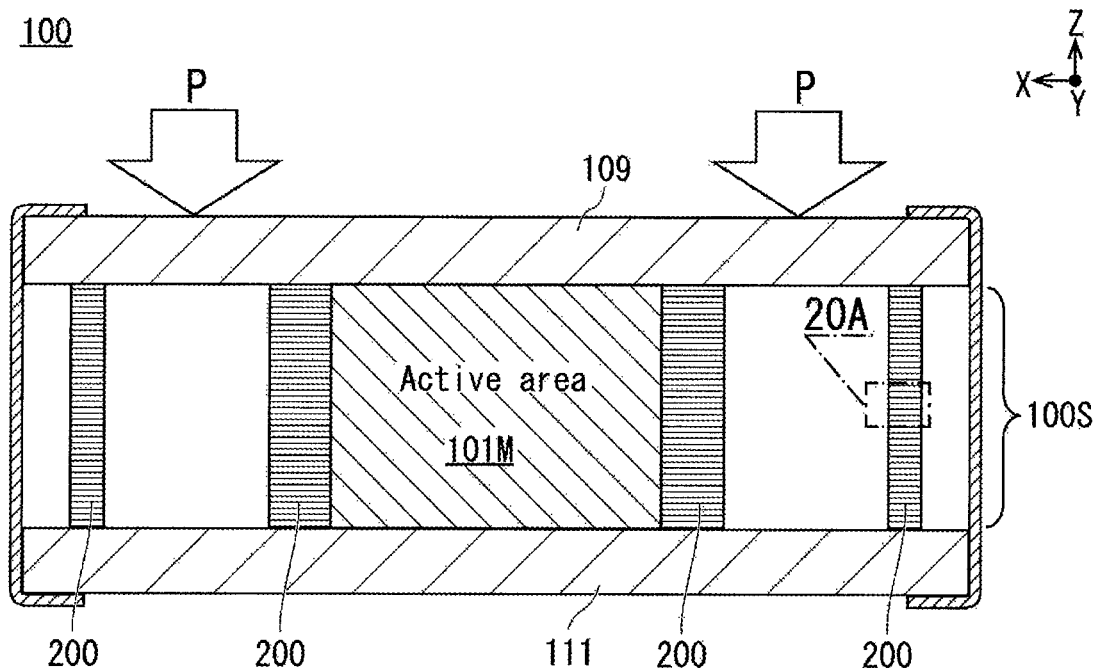
FIG. 19A is a cross-sectional view illustrating the fuel cell stack as a cross-sectional view taken along the line 19A-19A in FIG. 17.
Figure 19B:
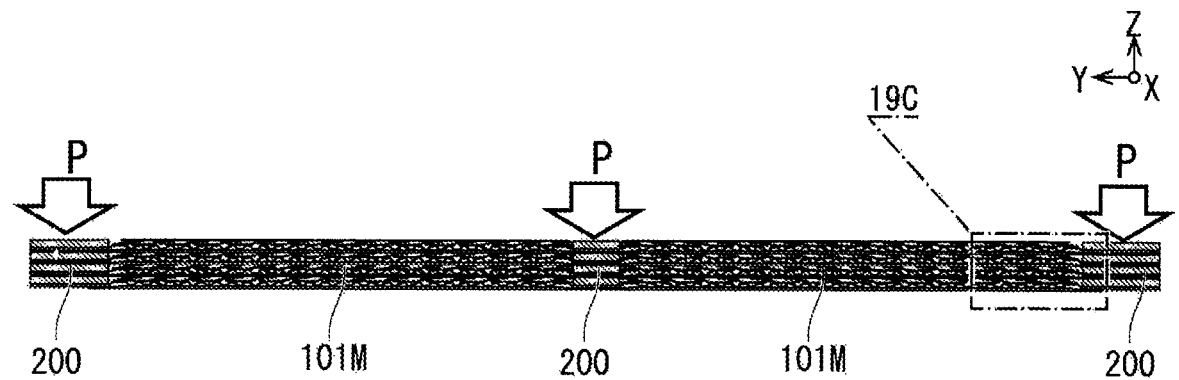
FIG. 19B is a cross-sectional view taken along the line 19B-19B of FIG. 18A.
Figure 19C:
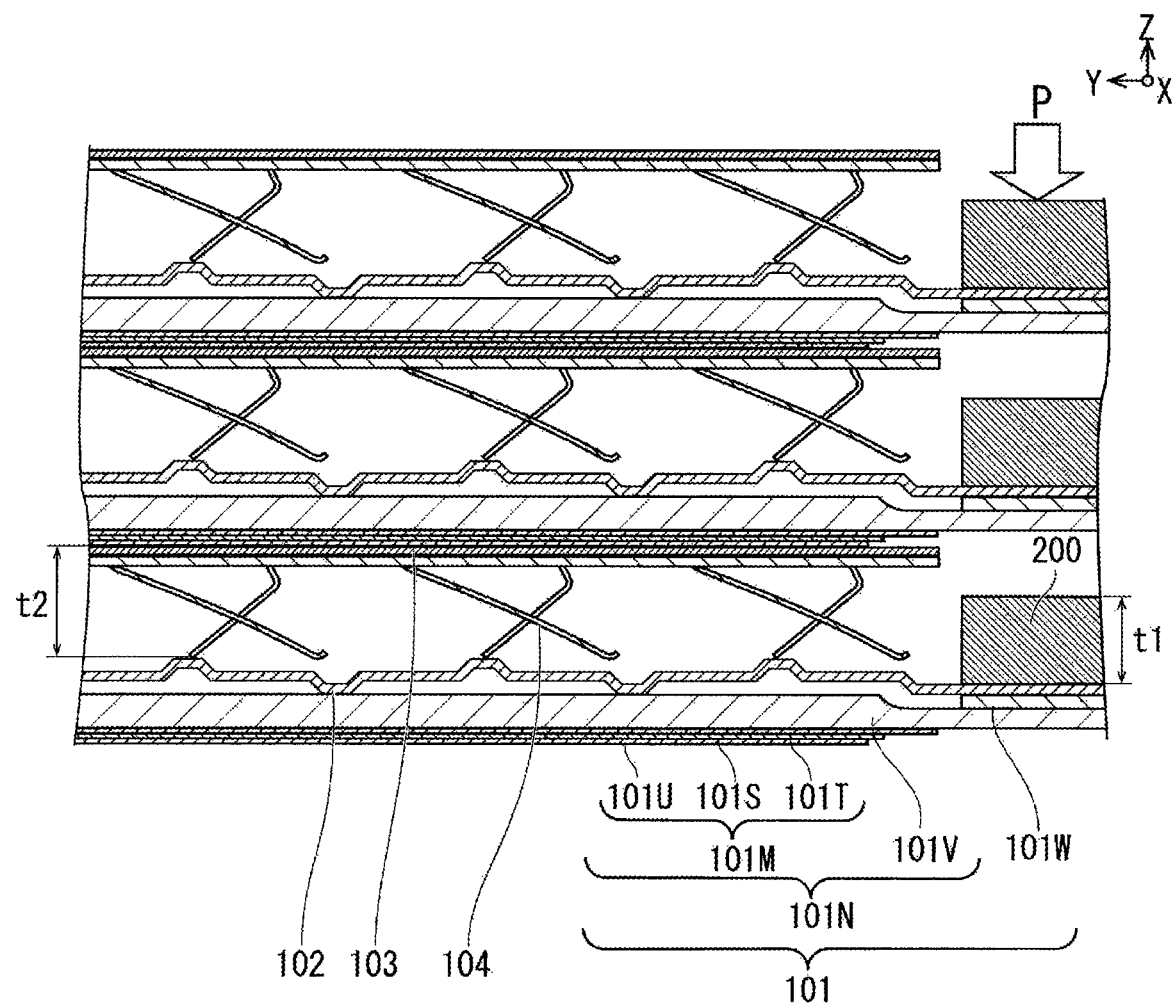
FIG. 19C is a cross-sectional view illustrating a region 19C in FIG. 19B in an enlarged manner and illustrates a state where spring members are uncompressed.
Figure 20A:
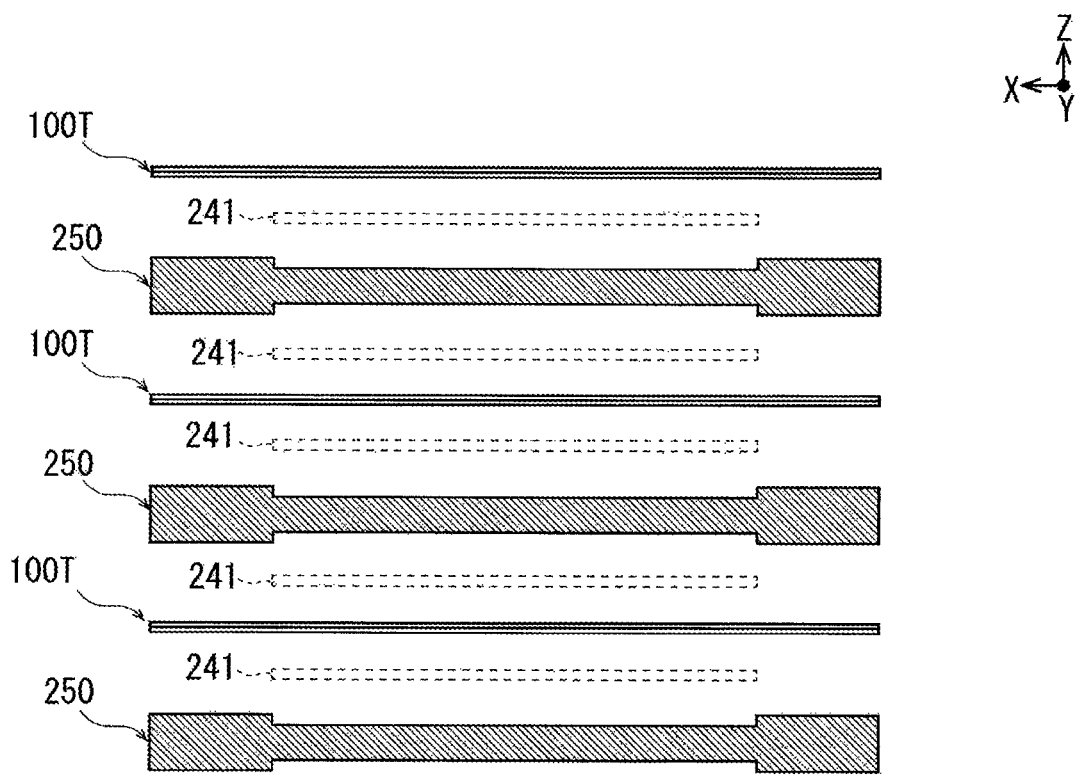
FIG. 20A is a view schematically illustrating a state where the multiple cell units and multiple sealing beam portions are stacked, as a cross-sectional view taken along the line 20A-20A of FIG. 17.
Figure 20B:
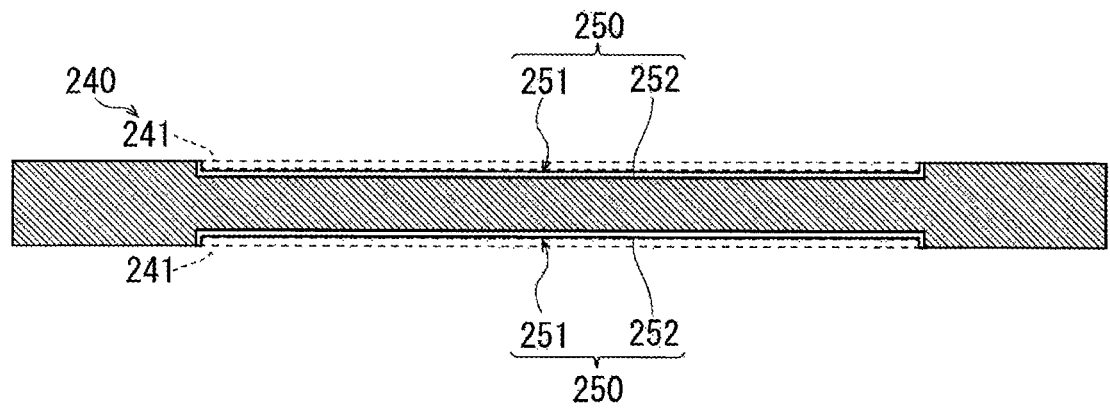
FIG. 20B is a cross-sectional view illustrating one of the sealing beam portions of FIG. 20A in an enlarged manner.

FIG. 17 is an upper view illustrating one of the frame bodies of FIGS. 5 to 7. FIG. 18A is a perspective view illustrating a state in which the multiple cell units and the multiple frame bodies of FIGS. 5 to 7 are stacked. FIG. 18B is a perspective view illustrating a region 18B in FIG. 18A in an enlarged manner. FIG. 19A is a cross-sectional view schematically illustrating a state where stacking load P is applied to the fuel cell stack 100. FIG. 19B is a cross-sectional view taken along the line 19B-19B of FIG. 18A. FIG. 19C is a cross-sectional view illustrating a region 19C in FIG. 19B in an enlarged manner. FIG. 20A is a cross-sectional view schematically illustrating a state where the multiple cell units 100T and multiple sealing beam portions 250 are stacked. FIG. 20B is a cross-sectional view illustrating one of the sealing beam portions 250 of FIG. 20A in an enlarged manner.

Each frame body 200 has a load transmitting function of transmitting, in the stacking direction Z, the stacking load P (see FIG. 19A) applied in the stacking direction Z when the fuel cell stack 100 is stacked and a function of a spacer maintaining an interval between the separator and the power generation cells 101M.

The frame body 200 is formed to have an insulating property by using, for example, a ceramic-based insulating material or a member obtained by subjecting a surface of an electrically-conductive material to insulating processing.

As illustrated in FIG. 17, the frame body 200 includes, as viewed in the stacking direction Z, multiple outer peripheral beam portions 210 provided in a rectangular shape on the outer peripheral side (side of an outer edge 102p of the separator 102) of a region where the multiple power generation cells 101M corresponding to the active areas are arranged to surround the region and multiple connection beam portions 220 connected to the outer peripheral beam portions 210.

In this description, the "connection beam portions 220 connected to the outer peripheral beam portions 210" is not limited to a mode in which the connection beam portions 220 are directly connected to the outer peripheral beam portions 210 and is assumed to also include a mode in which one connection beam portion 220 is indirectly connected to the outer peripheral beam portion 210 via another connection beam portion 220.

As illustrated in FIG. 17, each connection beam portion 220 is arranged between one power generation cell 101M and another power generation cell 101M adjacent to each other. The outer peripheral beam portions 210 and the connection beam portions 220 are thereby arranged to surround peripheries of the power generation cells 101M.

Moreover, as illustrated in FIG. 17, the outer peripheral beam portions 210 are arranged to be connected to at least one set of the sealing beam portions 250. Furthermore, the multiple outer peripheral beam portions 210, the multiple connection beam portions 220, and the multiple sealing beam portions 250 are arranged to be connected to one another.

Moreover, as illustrated in FIGS. 17 and 18B, the frame body 200 includes multiple groove portions 260 formed by cutting away portions of the outer peripheral beam portions 210 and the connection beam portions 220, in a recess shape extending in a direction along flow passages of the cathode gas CG and in a thickness direction (stacking direction Z). In the state where the frame bodies 200 and the cell units 100T are stacked as illustrated in FIG. 18A, communication holes 261 through which the cathode gas CG can flow are formed between the groove portions 260 and the cell units 100T as illustrated in FIG. 18B. The frame body 200 thus does not block the flow passages of the gas (cathode gas CG) in the in-plane direction (XY direction) and the gas can be thereby efficiently supplied to the power generation cells 101M. As a result, the fuel cell stack 100 can be improved in flowability of the gas and improved in the power generation efficiency.

As illustrated in FIG. 19A, when the stacking load P acts in the stacking direction Z with the frame body 200 and the cell unit 100T stacked, the frame body 200 receives the stacking load P in the peripheries of the power generation cells 101M corresponding to the active areas. The frame body 200 can thereby reduce stress applied to the power generation cells 101M.

As illustrated in FIG. 19C, the thickness t1 of each frame body 200 is configured to be smaller than a total thickness t2 of the thickness of each current collection assisting layer 103 and the thickness of each uncompressed spring member 104. As illustrated in FIG. 19B, the frame body 200 can thereby limit a compression amount (displacement) of the spring members 104 in the stacking direction Z. Accordingly, optimal conditions can be achieved in a creep resistant design by adjusting the compression amount (squeeze amount) of the spring members 104. This can suppress creep deformation of components such as the power generation cells 101M, the separators 102, and the spring members 104. Moreover, a higher normal mode frequency (resonance frequency) can be achieved by including the spring members 104 in the fuel cell stack 100. This can further improve the vibration resistance performance of the fuel cell stack 100.

Moreover, the frame body 200 further includes manifold portions 230 through which the anode gas AG can flow, multiple sealing portions 240 which at least partially seal peripheries of the manifold portions 230 to limit the flow of gas, and multiple sealing beam portions 250 which are formed along the sealing portions 240.

As illustrated in FIG. 17, the manifold portions 230 include an anode side first flow-in port 230a, an anode side second flow-in port 230b, and an anode side third flow-in port 230c which allow the anode gas AG to flow in and an anode side first flow-out port 230d and an anode side second flow-out port 230e which allow the anode gas AG to flow out.

Moreover, as illustrated in FIG. 17, in the frame body 200, a cathode side first flow-in port 200f and a cathode side second flow-in port 200g which allow the cathode gas CG to pass (flow in) and a cathode side first flow-out port 200h, a cathode side second flow-out port 200i, and a cathode side third flow-out port 200j which allow the cathode gas CG to pass (flow out) are formed in spaces between the manifold portions 230 on the outer peripheral side of the frame body 200.

The sealing portions 240 are arranged to surround the peripheries of the manifold portions 230 and have a sealing function of sealing the peripheries of the manifold portions 230. The sealing portions 240 can thereby prevent the anode gas AG from mixing into the cathode side flow passages.

Moreover, as illustrated in FIG. 20A, the sealing portions 240 are formed by arranging a brazing filler material 241 in recess portions 251 of the sealing beam portions 250 to be described later. The sealing portions 240 can thereby join the multiple cell units 100T and the multiple frame bodies 200 stacked one on top of another.

Furthermore, as illustrated in FIG. 20B, in the sealing portions 240, joining surfaces (XY plane) flat with respect to the cell unit 100T can be formed by using the brazing filler material 241. The fuel cell stack 100 can thereby evenly receive the stacking load in the sealing portions 240. Moreover, since the flat joining surfaces are formed in the sealing portions 240, it is possible to suppress the case where the reaction force of the sealing portions 240 generated in response to the reception of the stacking load is generated on the cell unit 100T side. Furthermore, using the brazing filler material 241 in the sealing portions 240 can suppress deformation which may occur after a lapse of long time. This can improve vibration resistance performance in long-time driving.

As illustrated in FIG. 20B, each sealing beam portion 250 includes the recess portions 251 which are at least partially recessed in the thickness direction (stacking direction Z) and metallized portions 252 in which metal films are formed on surfaces of the recess portion 251. Since the frame body 200 has an insulating property, the wettability of its surfaces is generally low. Providing the metallized portions 252 on the surfaces of the recess portions 251 can improve the wettability of the surfaces. This can improve the joining strength of the brazing filler material 241.

The sealing beam portion 250 includes the recess portions 251 and the second moment of area of the sealing beam portion 250 is thus greater that in the case where the cross-sectional shape is a rectangle. The sealing beam portion 250 can thereby suppress deformation caused by the stacking load acting in the stacking direction Z. Accordingly, the fuel cell stack 100 can be further improved in the vibration resistance performance. In the embodiment, as illustrated in FIG. 20B, the recess portions 251 are formed on upper and lower surfaces of the sealing beam portion 250. Accordingly, the cross-sectional shape of the sealing beam portion 250 in which the recess portions 251 are formed is an I-shape. Thus, the second moment of area of the sealing beam portion 250 is greater than that in the case where the cross-sectional shape is a rectangle. Hence, the sealing beam portion 250 can further suppress the deformation by the stacking load acting in the stacking direction Z and further improve the vibration resistance performance.

(Flow of Gases in Fuel Cell Stack 100)

Figure 21A:
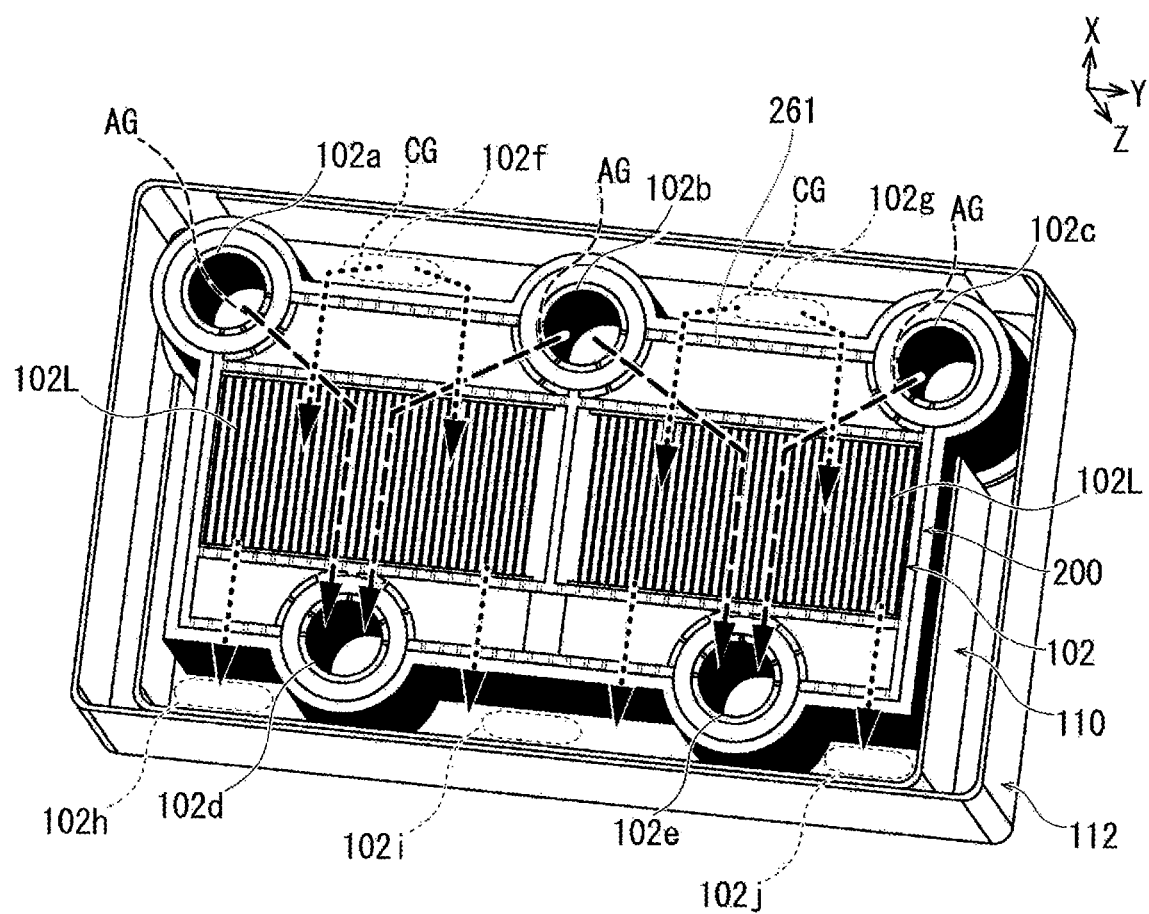
FIG. 21A is a perspective view schematically illustrating flows of anode gas and cathode gas in the fuel cell stack.
Figure 21B:
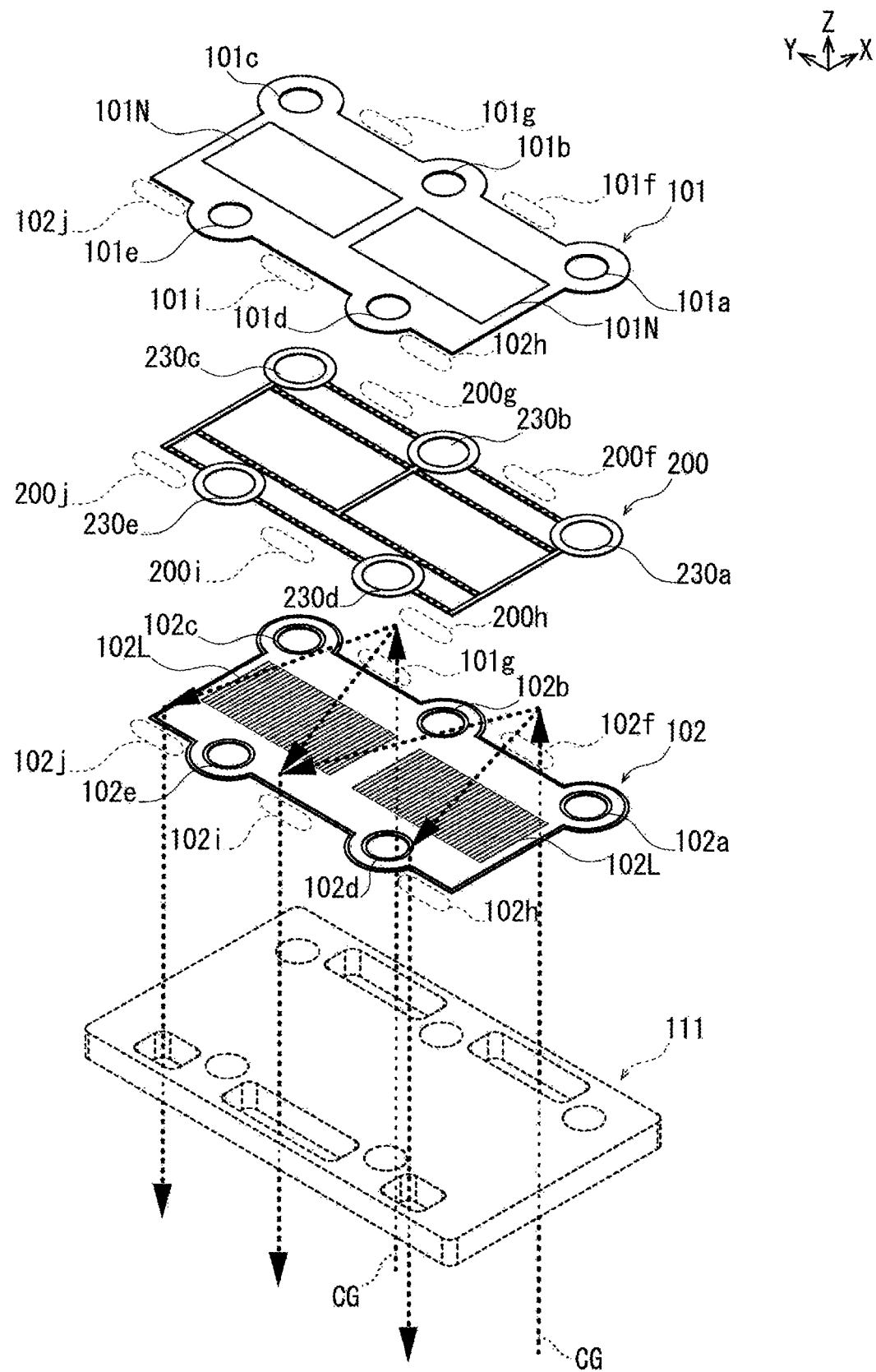
FIG. 21B is a perspective view schematically illustrating flows of the cathode gas in the fuel cell stack.
Figure 21C:
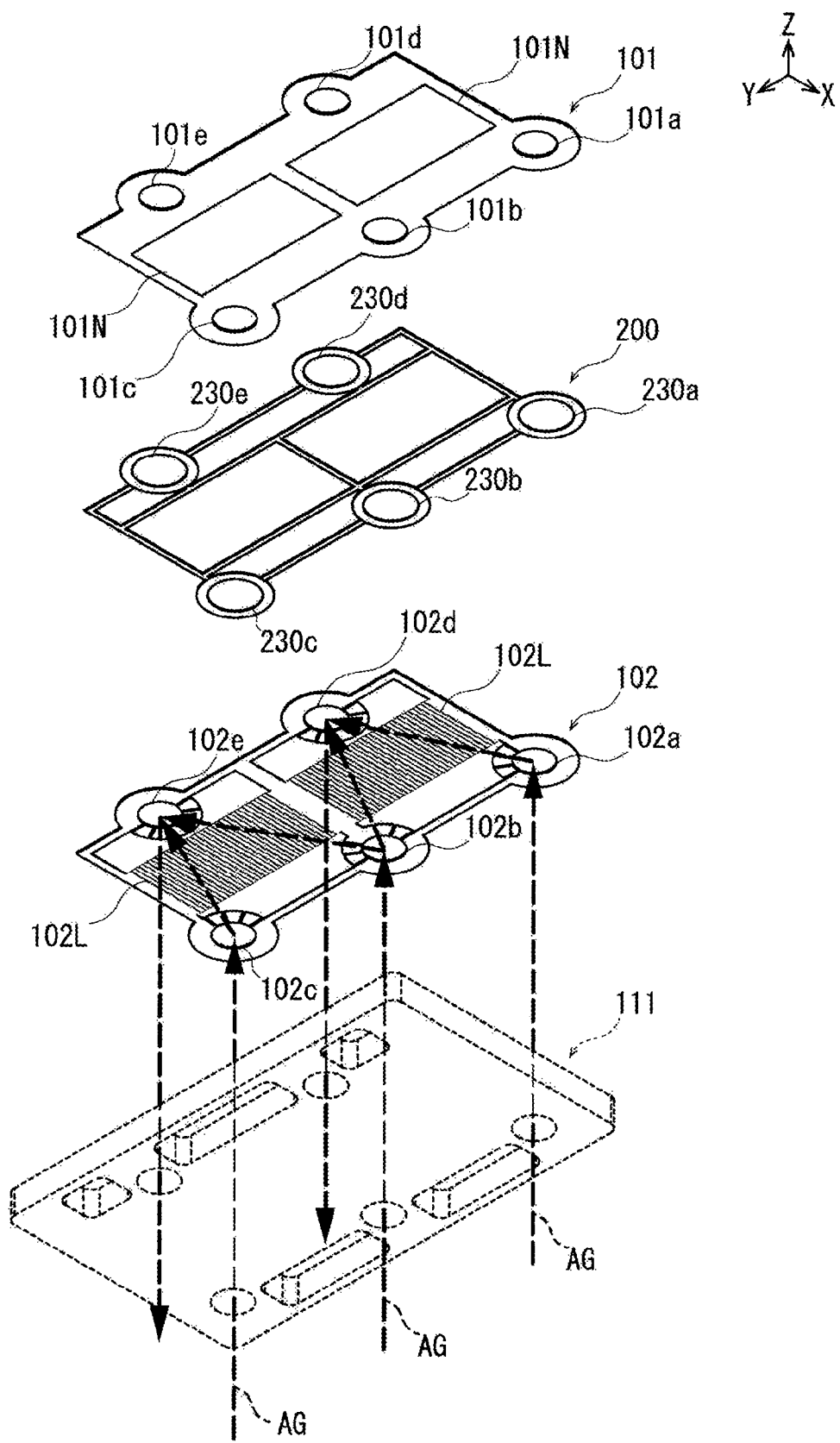
FIG. 21C is a perspective view schematically illustrating flows of the anode gas in the fuel cell stack.

FIG. 21A is a perspective view schematically illustrating flows of the anode gas AG and the cathode gas CG in the fuel cell stack 100. FIG. 21B is a perspective view schematically illustrating flows of the cathode gas CG in the fuel cell stack 100. FIG. 21C is a perspective view schematically illustrating flows of the anode gas AG in the fuel cell stack 100.

The anode gas AG passes through the flow-in ports of the external manifold 111, the lower end plate 108, the module ends 105, the manifold portions 230 of the frame bodies 200, the separators 102, and the metal-supported cell assemblies 101 and is supplied to the anodes 101T of the power generation cells 101M. Specifically, the anode gas AG is supplied from the external manifold 111 to the upper current collection plate 106 being the terminal end while being distributed to the anode side flow passages provided in the gaps between the separators 102 and the metal-supported cell assemblies 101 alternately stacked one on top of another. Thereafter, the anode gas AG reacts in the power generation cells 101M, passes through the flow-out ports of the aforementioned components, and is discharged in a state of exhaust gas.

As illustrated in FIG. 21A, the anode gas AG is supplied to the flow passage portions 102L while being isolated from the cathode gas CG such that a path of the anode gas AG intersects a path of the cathode gas CG. In FIG. 21C, the anode gas AG passes through the anode side first flow-in port 102a, the anode side second flow-in port 102b, and the anode side third flow-in port 102c of the separator 102 located on the lower side in FIG. 21C, passes through the anode side first flow-in port 101a, the anode side second flow-in port 101b, and the anode side third flow-in port 101c of the metal-supported cell assembly 101, and then flows into the flow passage portions 102L of the separator 102 located on the upper side in FIG. 21C to be supplied to the anodes 101T of the power generation cells 101M of the metal-supported cell assembly 101. The anode gas AG having reacted in the anodes 101T flows out from the flow passage portions 102L of the separator 102 located on the upper side in FIG. 21C in the state of exhaust gas, passes through the anode side first flow-out port 101d and the anode side second flow-out port 101e of the metal-supported cell assembly 101, and passes through the anode side first flow-out port 102d and the anode side second flow-out port 102e of the separator 102 located on the lower side in FIG. 21C to be discharged to the outside.

The cathode gas CG passes through the flow-in ports of the external manifold 111, the lower end plate 108, the module ends 105, the separators 102, the metal-supported cell assemblies 101, and the frame bodies 200 and the communication holes 261 (see FIG. 18B) formed between the frame bodies 200 and the cell units 100T and is supplied to the cathodes 101U of the power generation cells 101M. Specifically, the cathode gas CG is supplied from the external manifold 111 to the upper current collection plate 106 being the terminal end while being distributed to the cathode side flow passages provided in the gaps between the metal-supported cell assemblies 101 and the separators 102 alternately stacked one on top of another. Thereafter, the cathode gas CG reacts in the power generation cells 101M, passes through the flow-out ports of the aforementioned components, and is discharged in the state of exhaust gas. The flow-in ports and the flow-out ports of the cathode gas CG in the aforementioned components are formed by the gaps between the outer peripheral surfaces of the aforementioned components and the inner surface of the air shelter 110.

In FIG. 21B, the cathode gas CG passes through the cathode side first flow-in port 102f and the cathode side second flow-in port 102g of the separator 102 located on the lower side in FIG. 21B and flows into the flow passage portions 102L of the separator 102 to be supplied to the cathodes 101U of the power generation cells 101M in the metal-supported cell assembly 101. The cathode gas CG having reacted in the cathodes 101U flows out from the flow passage portions 102L of the separator 102 located on the lower side in the FIG. 21B in the state of exhaust gas and passes through the cathode side first flow-out port 102h, the cathode side second flow-out port 102i, and the cathode side third flow-out port 102j of the separator 102 to be discharged to the outside. Note that, in the embodiment, the fuel cell stack 100 has a so-called open cathode structure in which the cathode gas CG can freely flow in the cover 112.

Operations and effects of the fuel cell stack 100 according to the aforementioned embodiment are described.

As described above, the fuel cell stack 100 according to the embodiment is a fuel cell stack in which multiple cell units 100T are stacked one on top of another, each cell unit 100T including: the power generation cells 101M in each of which the electrolyte 101S is held between the paired electrodes 101T, 101U from opposite sides and which generate power by using the supplied gas; and the separator 102 which defines and forms the flow passage portions 102L, being the flow paths of the gas, between itself and the power generation cells 101M. The fuel cell stack includes the frame bodies 200 which have the insulating property and which are arranged between at least one set of cell units 100T adjacent to each other. Each frame body 200 includes, as viewed in the stacking direction Z, the outer peripheral beam portions 210 provided on the outer peripheral side of the region in which the power generation cells 101M are arranged to surround the region and the connection beam portions 220 connected to the outer peripheral beam portions 210.

In the fuel cell stack 100 described above, each frame body 200 has the load transmitting function of transmitting, in the stacking direction Z, the stacking load P applied in the stacking direction Z when the fuel cell stack 100 is stacked. Moreover, since the frame body 200 receives the stacking load in the outer peripheral beam portions 210 and the connection beam portions 220 of the frame body 200, the stacking load can be more evenly received on the horizontal plane (XY plane) than in the case where the stacking load is applied only to the outer peripheral beam portions 210. The load can be thereby transmitted in the stacking direction Z in the fuel cell stack 100 in an excellent manner. Thus, it is possible to reduce the stress applied to the frame body 200 and suppress creep deformation in the frame body 200. As a result, high stacking load can be applied to the fuel cell stack 100. Thus, in the fuel cell stack 100, it is possible to improve the vibration resistance performance in long time driving and maintain the restraining force of the stacked components in the fuel cell stack 100 for a long period.

Particularly, the fuel cell stack 100 according to embodiment is a Solid Oxide Fuel Cell (SOFC) using solid oxide ceramic for the electrolytes 101S and the operation temperature thereof is very high, which is about 600 to 1000° C. Accordingly, creep deformation of the components is more likely occur in the operation than in a polymer electrolyte membrane fuel cell. The aforementioned configuration can prevent the creep deformation of the components in the fuel cell stack 100 and improve the vibration resistance performance of the fuel cell stack 100 in long time driving in a high temperature state.

Moreover, each frame body 200 further includes the multiple manifold portions 230 through which the gas can flow, the multiple sealing portions 240 which at least partially seals the peripheries of the manifold portions 230 to limit the flow of gas, and the multiple sealing beam portions 250 which are formed along the sealing portions 240. The sealing beam portions 250 receive the stacking load acting in the stacking direction Z and can thereby reduce the stress applied to the sealing portions 240. The sealing portions 240 can thereby maintain the sealing performance.

Furthermore, since each outer peripheral beam portion 210 is arranged to connect at least one set of the sealing beam portions 250, the stress applied to the sealing beam portions 250 by the stacking load acting in the stacking direction Z can be distributed to the outer peripheral beam portion 210. Furthermore, even when external force acts in the in-plane direction (XY direction) of the frame body 200, the stress applied to the sealing beam portions 250 can be distributed to the outer peripheral beam portion 210. The frame body 200 can thereby prevent concentration of stress in the sealing portions 240.

Moreover, since the outer peripheral beam portions 210, the connection beam portions 220, and the sealing beam portions 250 are connected to one another, the stress applied to the frame body 200 by the stacking load acting in the stacking direction Z can be distributed to the outer peripheral beam portions 210, the connection beam portions 220, and the sealing beam portions 250. Furthermore, even when external force acts in the in-plane direction (XY direction) of the frame body 200, stress can be distributed to the outer peripheral beam portions 210, the connection beam portions 220, and the sealing beam portions 250. The frame body 200 can thereby reduce stress applied to each member. The frame body 200 can thereby suppress deformation due to external force and further improve the vibration resistance performance of the fuel cell stack 100.

Furthermore, since each sealing beam portion 250 at least partially includes the recess portions 251 recessed in the thickness direction (stacking direction Z), the second moment of area thereof is greater that in the case where the cross-sectional shape is a rectangle. The sealing beam portion 250 is thus less likely to deform due to the stacking load acting in the stacking direction Z. Accordingly, the fuel cell stack 100 can be further improved in the vibration resistance performance.

Furthermore, the sealing beam portion 250 includes the metallized portions 252 in which the metal films are formed on the surfaces of the recess portions 251. The sealing portions 240 are formed by arranging the brazing filler material 241 in the recess portions 251 of the sealing beam portion 250. Since the frame body 200 has an insulating property, the wettability of its surfaces is generally low. Providing the metallized portions 252 on the surfaces of the recess portions 251 can improve the wettability of the surfaces. This can improve the joining strength of the sealing portions 240. Moreover, in the sealing portions 240, the joining surface (XY plane) flat with respect to the cell unit 100T can be formed by using the brazing filler material 241. The fuel cell stack 100 can thereby evenly receive the stacking load in the sealing portions 240. Furthermore, since the flat joining surfaces are formed in the sealing portions 240, it is possible to suppress the case where the reaction force of the sealing portions 240 generated in response to the reception of the stacking load is generated on the cell unit 100T side. Moreover, using the brazing filler material 241 in the sealing portions 240 can suppress deformation which may occur after a lapse of long time. This can improve the vibration resistance performance of the fuel cell stack 100 in long-time driving.

Moreover, each cell unit 100T further includes the cell frame 101W (holding member) which holds the power generation cells 101M and the multiple power generation cells 101M are arranged in the cell frame 101W side by side. The frame body 200 is arranged to surround the peripheries of the power generation cells 101M. Accordingly, when the stacking load P acting in the stacking direction Z is applied to the fuel cell stack 100, the frame body 200 receives the stacking load P in the peripheries of the power generation cells 101M. As a result, the stress applied to the power generation cells 101M by the stacking load acting in the stacking direction Z can be reduced.

Furthermore, the frame body 200 includes the groove portions 260 forming the communication holes 261 between the frame body 200 and the cell unit 100T, the communication holes 261 allowing the gas to flow therethrough. The frame body 200 thus does not block the flow passages of the gas (cathode gas CG) in the in-plane direction (XY direction) and the gas can be thereby efficiently supplied to the power generation cells 101M. As a result, the fuel cell stack 100 can be improved in the gas flowability and improved in the power generation efficiency.

Moreover, each cell unit 100T further includes the current collection assisting layers 103 which assist the electrical connection between the power generation cells 101M and the separator 102 and the spring members 104 which are provided between the current collection assisting layers 103 and the separator 102 and which press the separator 102 against the power generation cells 101M. The current collection assisting layers 103 are arranged between the power generation cells 101M and the separator 102 and can make the surface pressure even while forming spaces through which the gas passes and assist the electrical connection between the power generation cells 101M and the separator 102. Moreover, the spring members 104 can press the current collection assisting layers 103 against the power generation cells 101M to bring the current collection assisting layers 103 into contact with the power generation cells 101M with sufficient surface pressure. Accordingly, the fuel cell stack 100 can be sufficiently improved in the power generation efficiency. Moreover, a higher normal mode frequency (resonance frequency) can be achieved by including the spring members 104 in the fuel cell stack 100. This can further improve the vibration resistance performance of the fuel cell stack 100.

Furthermore, the thickness t1 of each frame body 200 is smaller than the total thickness t2 of the thickness of each current collection assisting layer and the thickness of each uncompressed spring member 104. The frame body 200 can thereby limit a compression amount (displacement) of the spring member 104 in the stacking direction Z. Accordingly, optimal conditions can be achieved in the creep resistant design by adjusting the compression amount (squeeze amount) of the spring members 104. This can suppress creep deformation of components such as the power generation cells 101M, the separators 102, and the spring members 104.

Modified Example 1

Figure 22A:
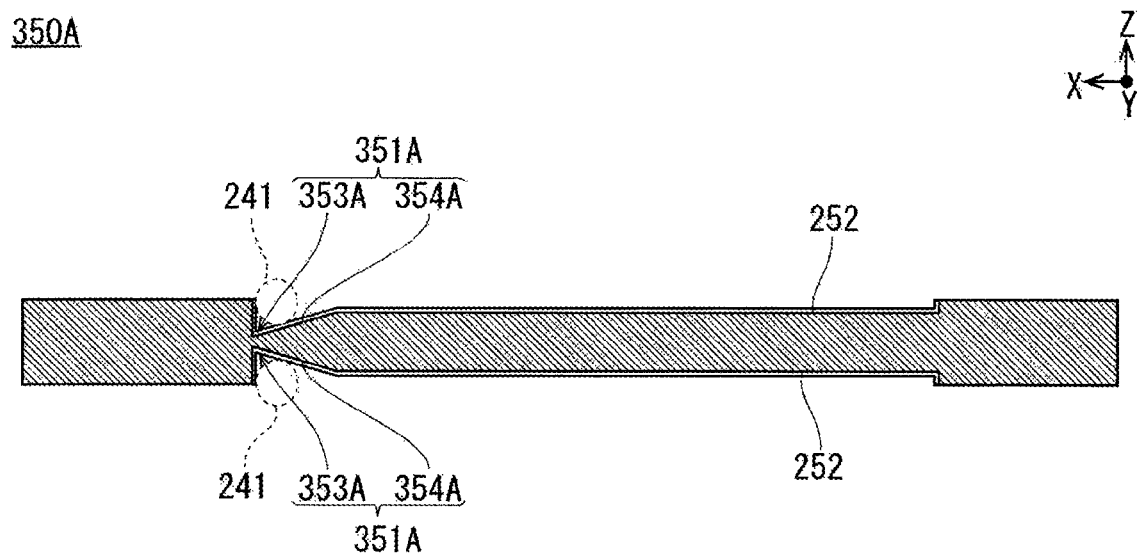
FIG. 22A is a cross-sectional view illustrating recess portions in a frame body according to one mode of Modified Example 1.
Figure 22B:
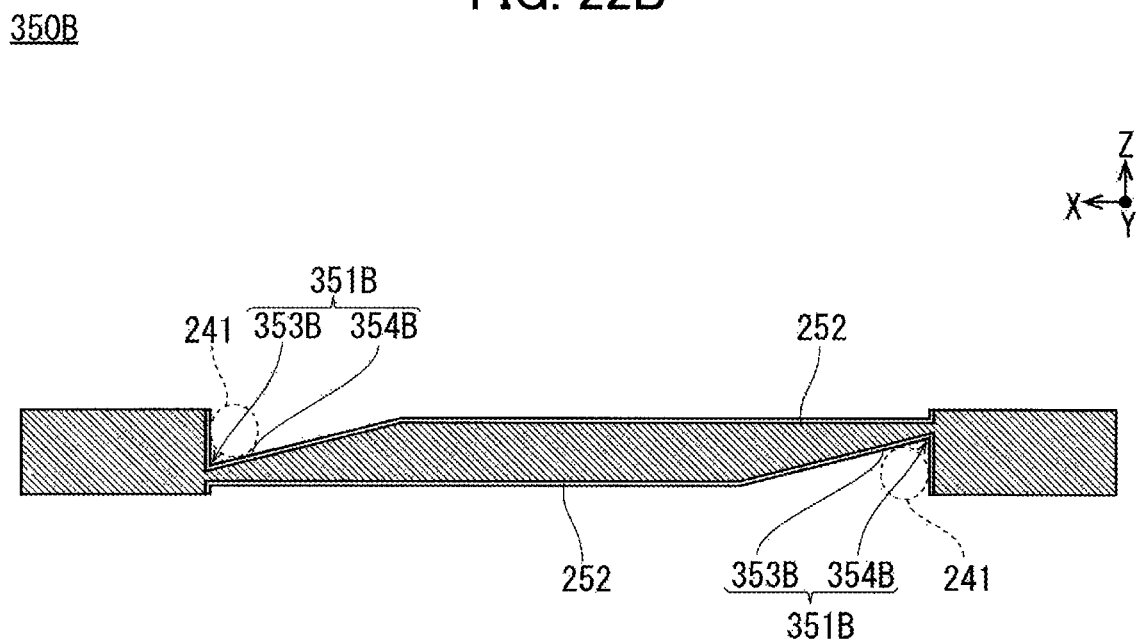
FIG. 22B is a cross-sectional view illustrating recess portions in a frame body according to another mode of Modified Example 1.

FIG. 22A is a cross-sectional view illustrating recess portions 351A of a sealing beam portion 350A according to one mode of Modified Example 1. FIG. 22B is a cross-sectional view illustrating recess portions 351B of a sealing beam portion 350B according to another mode of Modified Example 1.

The sealing beam portions 350A, 350B according to Modified Example 1 are different from the sealing beam portion 250 according to the aforementioned embodiment in the shape of the recess portions 351A, 351B. Note that, since the other configurations are the same as those in the aforementioned embodiment, description thereof is omitted.

The recess portions 351A, 351B of the sealing beam portions 350A, 350B according to Modified Example 1 include housing portions 353A, 353B capable of housing the solid brazing filler material 241 before being melted and tilted portions 354A, 354B extending from the housing portions 353A, 353B in the width direction of the sealing beam portions 350A, 350B and tilted in the thickness direction of the sealing beam portions 350A, 350B.

In the sealing beam portion 350A according to the one mode of Modified Example 1 illustrated in FIG. 22A, the housing portions 353A and the tilted portions 354A of the recess portions 351A are arranged to face each other on the upper and lower sides of the sealing beam portion 350A. In the sealing beam portion 350B according to the other mode of Modified Example 1 illustrated in FIG. 22B, the housing portions 353B and the tilted portions 354B of the recess portions 351B may be arranged to be shifted from each other on the upper and lower sides of the sealing beam portion 350B.

As described above, the recess portions 351A, 351B of the sealing beam portions 350A, 350B according to Modified Example 1 include the housing portions 353A, 353B capable of housing the brazing filler material 241 and the tilted portions 354A, 354B extending from the housing portions 353A, 353B in the width direction of the frame body 200 and tilted in the thickness direction of the frame body 200. Since the amount of the brazing filler material 241 can be defined by arranging the brazing filler material 241 in the housing portions 353A, 353B, the amount of the brazing filler material 241 can be easily managed. Moreover, since the brazing filler material 241 housed in the housing portions 353A, 353B spreads over the entire surface of the recess portions 351A, 351B through the tilted portions 354A, 354B by means of capillary action, the brazing filler material 241 can be easily applied.

Modified Example 2

Figure 23A:
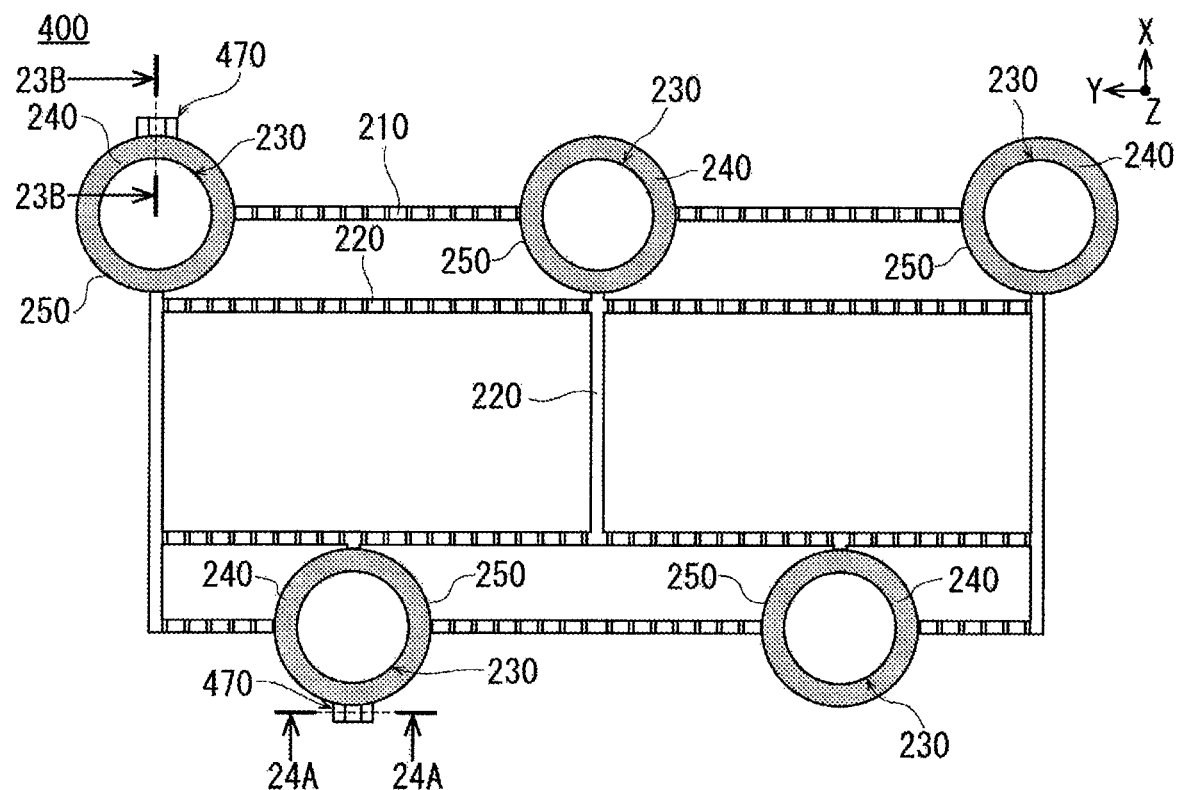
FIG. 23A is an upper view illustrating a frame body according to Modified Example 2.
Figure 23B:
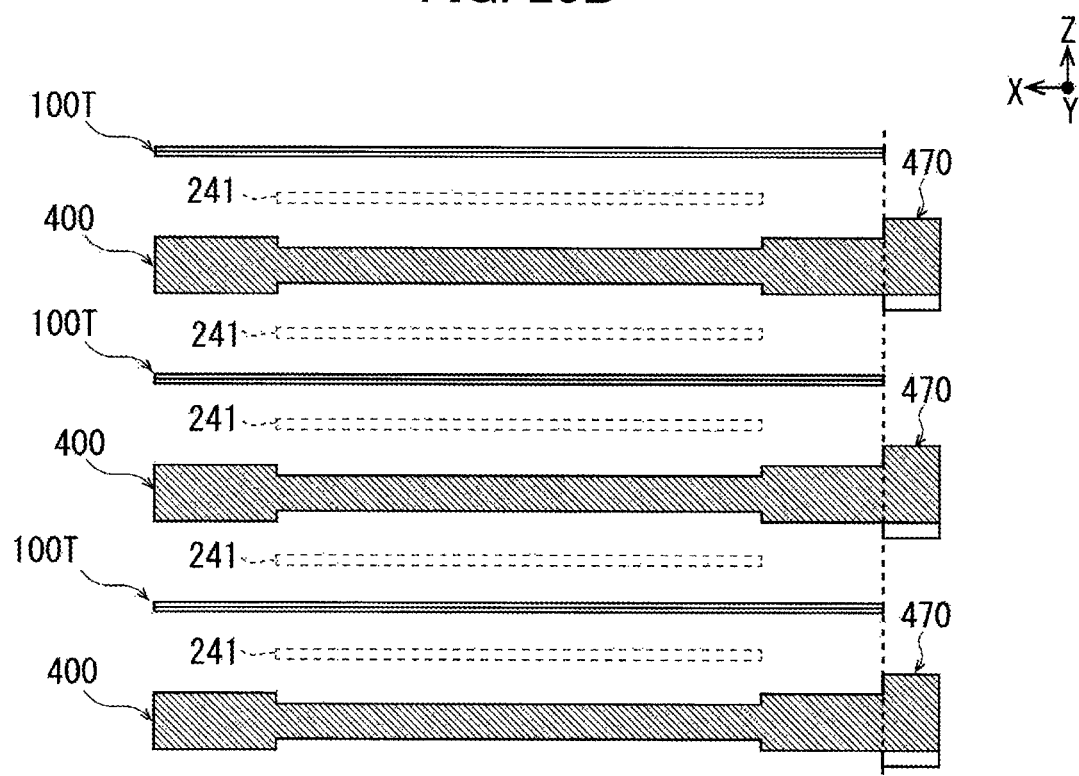
FIG. 23B is a cross-sectional view taken along the line 23B-23B of FIG. 23A.
Figure 24A:
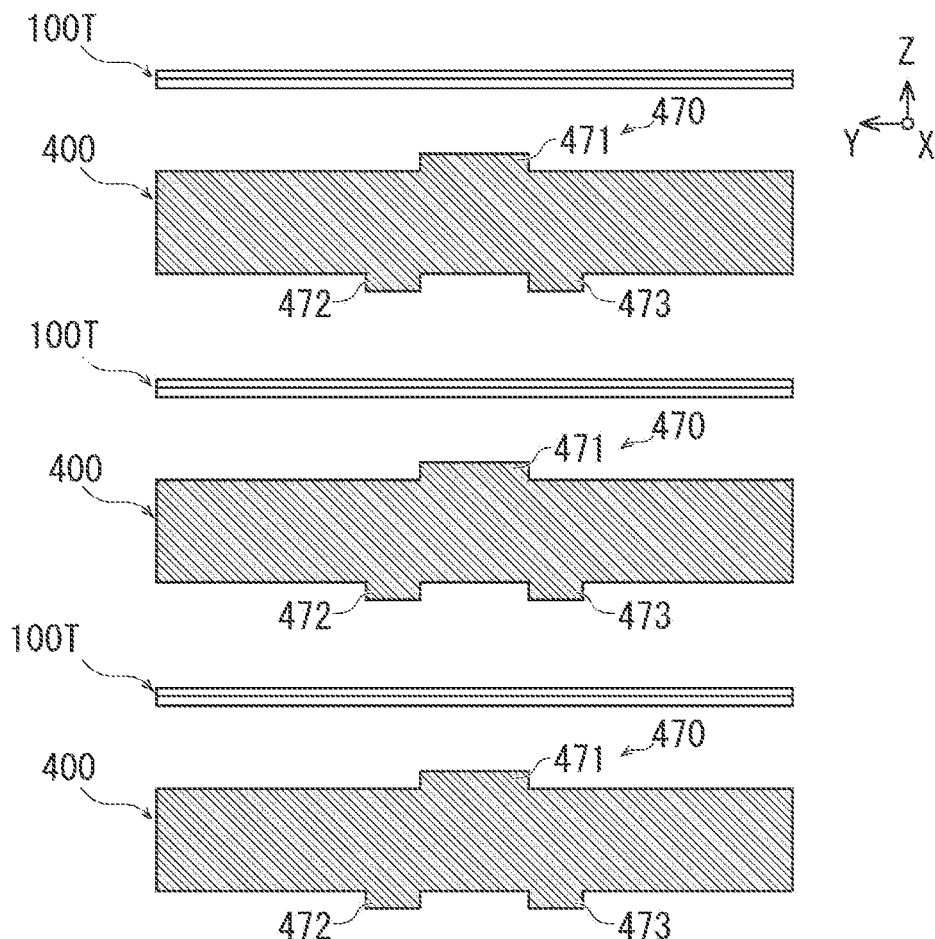
FIG. 24A is a cross-sectional view take along the line 24A-24A of FIG. 23A.
Figure 24B:
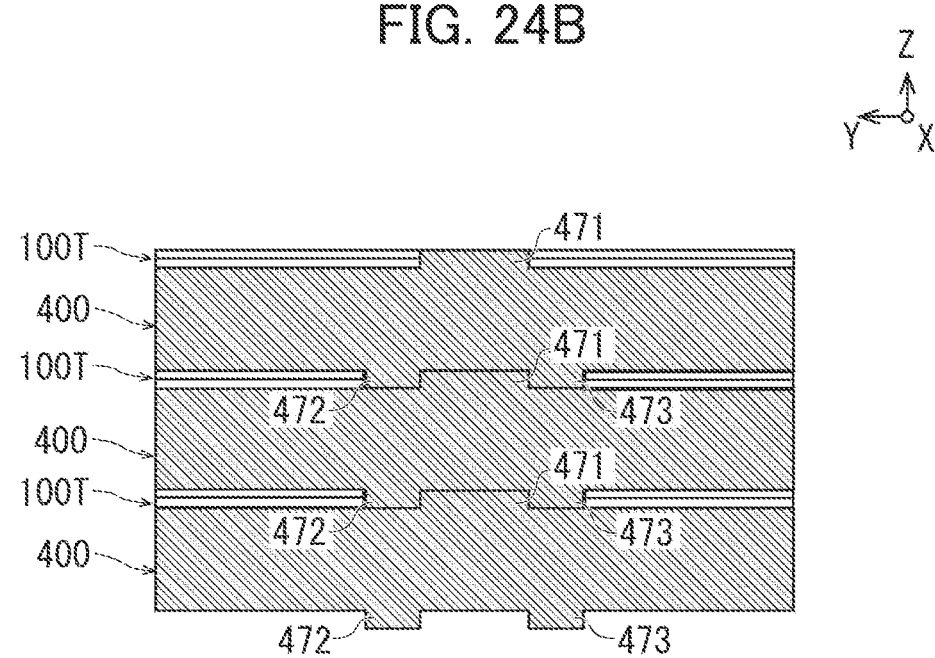
FIG. 24B is a cross-sectional view illustrating a state where the frame bodies and the cell units of FIG. 24A are stacked one on top of another.

FIG. 23A is an upper view illustrating a frame body 400 according to Modified Example 2. FIG. 23B is a cross-sectional view taken along the line 23B-23B of FIG. 23A. FIG. 24A is a cross-sectional view taken along the line 24A-24A of FIG. 23A. FIG. 24B is a cross-sectional view illustrating a state where the frame bodies 400 and the cell units 100T of FIG. 24A are stacked one on top of another.

As illustrated in FIG. 23A, the frame body 400 according to Modified Example 2 is different from the frame body 200 of the aforementioned embodiment in that the frame body 400 includes alignment portions 470 which align the adjacent frame bodies 400 to each other. Note that, since the other configurations are the same as those in the aforementioned embodiment, description thereof is omitted.

As illustrated in FIG. 23A, the alignment portions 470 are provided on the outer peripheral side of the cell units 100T as viewed in the stacking direction Z. As illustrated in FIG. 23B, the alignment portions 470 are formed in portions extending from the sealing beam portions 250 in the in-plane direction (XY direction) of the frame bodies 400.

As illustrated in FIG. 24A, each alignment portion 470 includes a first protruding portion 471 which protrudes upward in the thickness direction of the frame body and a second protruding portion 472 and a third protruding portion 473 which protrude downward in the thickness direction of the frame body 400. As illustrated in FIG. 24B, the alignment portions 470 are configured such that, when the multiple frame bodies 400 and the cell units 100T are stacked one on top of another, the first protruding portion 471 of the alignment portion 470 in one frame body 400 is fitted between the second protruding portion 472 and the third protruding portion 473 of the alignment portion 470 in another frame body. The alignment portions 470 can thereby align the frame bodies 400 at the stacking positions in the in-plane direction of the frame bodies 400.

As described above, the frame bodies 400 according to Modified Example 2 are provided on the outer peripheral side of the cell units 100T as viewed in the stacking direction Z and include the alignment portions 470 which align the adjacent frame bodies 400 to each other. The misalignment in stacking of the cell units 100T and the frame bodies 400 in manufacturing of the fuel cell stack can be thereby prevented. Moreover, the frame bodies 400 can be prevented from shifting in the in-plane direction (XY direction) in response to input of vibration. Accordingly, the vibration resistance performance of the fuel cell stack 100 can be further improved.

Modified Example 3

Figure 25:
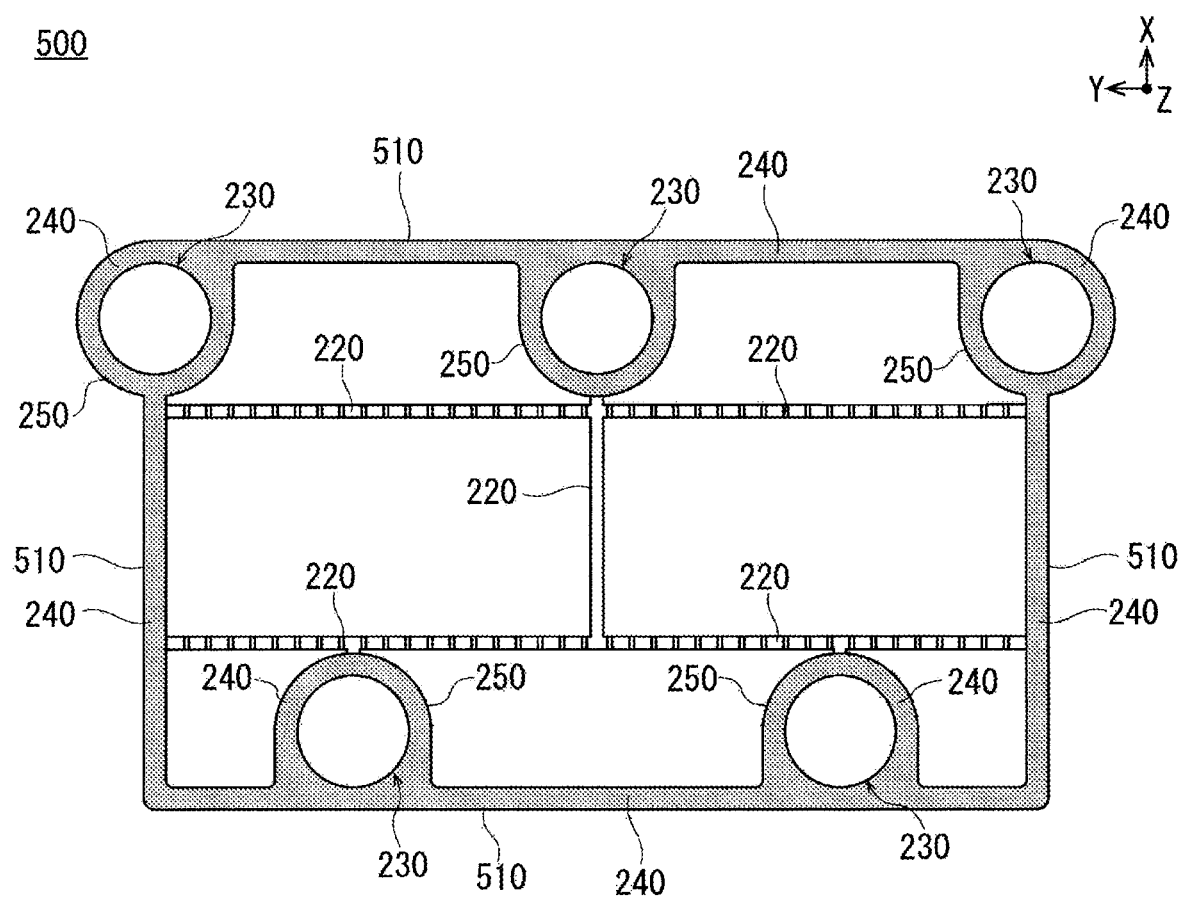
FIG. 25 is an upper view illustrating a frame body according to Modified Example 3.

FIG. 25 is an upper view illustrating a frame body 500 according to Modified Example 3.

The frame body 500 according to Modified Example 3 is different from the frame body 200 according to the aforementioned embodiment in that the sealing portions 240 are provided in outer peripheral beam portions 510. Note that, since the other configurations are the same as those in the aforementioned embodiment, description thereof is omitted.

Like the sealing beam portion 250 according to the aforementioned embodiment, the outer peripheral beam portions 510 according to Modified Example 3 include recess portions recessed in the thickness direction (stacking direction Z) and metallized portions in which metal films are formed on surfaces of the recess portions. The sealing portions 240 are arranged in the recess portions of the outer peripheral beam portions 510.

In the aforementioned embodiment, the fuel cell stack 100 is described to have an open cathode structure. However, due to the aforementioned configuration, the fuel cell stack according to Modified Example 3 can be configured to have a closed cathode structure in which the sealing portions 240 are provided in the outer periphery of the frame body 500.

Although the fuel cell stack according to the present invention has been described above by using the embodiment and the modified examples of the embodiment, the present invention is not limited to the contents described in the embodiment and the modified examples of the embodiment and can be appropriately changed based on the description of the claims.

For example, in the embodiment and the modified examples of the embodiment, the fuel cell stack is described as a Solid Oxide Fuel Cell (SOFC). However, the fuel cell stack may be configured as a Polymer Electrolyte Membrane Fuel Cell (PEMFC), a Phosphoric Acid Fuel Cell (PAFC), or a Molten Carbonate Fuel Cell (MCFC). In other words, the fuel cell stack can be applied to a Polymer Electrolyte Membrane Fuel Cell (PEMFC), a Phosphoric Acid Fuel Cell (PAFC), and a Molten Carbonate Fuel Cell (MCFC), in addition to a Solid Oxide Fuel Cell (SOFC).

Moreover, the mode of the frame body is not limited to a mode including multiple connection beam portions and may be a mode including only one connection beam portion.

Moreover, in the aforementioned embodiment, the mode of the connection beam portions is described to be a mode in which both ends of each connection beam portion are connected to the outer peripheral beam portion or another connection beam portion as illustrated in FIG. 17. However, it is possible to employ a mode in which only one end is connected to the outer peripheral beam portion or another connection beam portion.

The configurations of the fuel cell stack described in the embodiment and the modified examples of the embodiment can be appropriately combined as long as such a combination does not contradict with the invention described in the claims and are not limited only to the combinations described in the description.

Moreover, the structures of the parts, the arrangement of the members, and the like in the fuel cell stack described in the embodiment and the modified examples of the embodiment can be appropriately changed and omission of used additional members described in the drawings, use of other additional members, and the like can be appropriately performed.

REFERENCE SIGNS LIST

100 fuel cell stack
100M cell stack assembly
100S stack
100T cell unit
100U joined body
100P upper module unit
100Q middle module unit
100R lower module unit
101 metal-supported cell assembly
101M power generation cell
101N metal-supported cell
101S electrolyte
101T anode (fuel electrode)
101U cathode (oxidant electrode)
101V support metal
101W cell frame (holding member)
101$k$ opening portion
102 separator
102L flow passage portion
102$p$ outer edge
102$q$ groove
102$x$ flat portion
102$y$ anode side projection
102$z$ cathode side projection
103 current collection assisting layer
104 spring member
105 module end
106 upper current collection plate
107 lower current collection plate
108 lower end plate
109 upper end plate
110 air shelter
111 external manifold
200, 400, 500 frame body
210, 510 outer peripheral beam portion
220 connection beam portion
230 manifold portion
240 sealing portion
241 brazing filler material
250, 350A, 350B sealing beam portion
251, 351A, 351B recess portion
252 metallized portion
353A, 353B housing portion
354A, 354B tilted portion
260 groove portion
261 communication hole
470 alignment portion
101$a$, 102$a$, 105$a$, 107$a$, 108$a$, 111$a$, 230$a$ anode side first flow-in port
101$b$, 102$b$, 105$b$, 107$b$, 111$b$, 108$b$, 230$b$ anode side second flow-in port
101$c$, 102$c$, 105$c$, 107$c$, 111$c$, 108$c$, 230$c$ anode side third flow-in port
101$d$, 102$d$, 108$d$, 107$d$, 111$d$, 105$d$, 230$d$ anode side first flow-out port
101$e$, 102$e$, 105$e$, 107$e$, 111$e$, 108$e$, 230$e$ anode side second flow-out port
101$f$, 108$f$, 102$f$, 105$f$, 107$f$, 111$f$, 200$f$ cathode side first flow-in port
101$g$, 102$g$, 105$g$, 107$g$, 108$g$, 111$g$, 200$g$ cathode side second flow-in port 101h, 102h, 111h, 105h, 107h, 108h, 200h cathode side first flow-out port
101i, 102i, 105i, 107i, 108i, 111i, 200i cathode side second flow-out port
101j, 102j, 105j, 107j, 108j, 111j, 200j cathode side third flow-out port
112 cover
V joining line
AG anode gas
CG cathode gas
t1 thickness of frame body
t2 total thickness of thickness of current collection assisting layer and thickness of
uncompressed spring member
X short-side direction (of fuel cell stack)
Y long-side direction (of fuel cell stack)
Z stacking direction (of fuel cell stack)

The invention claimed is:

1. A fuel cell stack in which cell units are stacked one on top of another, each of the cell units including: a power generation cell including an electrolyte held between a pair of electrodes from opposite sides and configured to generate power by using supplied gas; and a separator defining and forming a flow passage portion, being a flow path of the gas, between the separator and the power generation cell, the fuel cell stack comprising:
a frame body having an insulating property and arranged between at least one set of the cell units adjacent to each other,
wherein the frame body includes,
as viewed in a stacking direction, outer peripheral beam portions provided to surround an outer peripheral side of a region in which the power generation cell is arranged,
a connection beam portion connecting the outer peripheral beam portions to each other, and
sealing beam portions formed along sealing portions at least partially sealing a manifold portion through which the gas is allowed to flow to the separator,
the sealing beam portions at least partially have recess portions recessed in a thickness direction,
the sealing beam portions include metallized portions in which metal films are formed on surfaces of the recess portions, and
the sealing portions are formed by arranging a brazing filler material in the recess portions of the sealing beam portions.

2. The fuel cell stack according to claim 1, wherein the outer peripheral beam portions are arranged to connect at least one set of the sealing beam portions.

3. The fuel cell stack according to claim 1, wherein the outer peripheral beam portions, the connection beam portion, and the sealing beam portions are arranged to be connected to one another.

4. The fuel cell stack according to claim 1, wherein the recess portions of the sealing beam portions include:
housing portions capable of housing the brazing filler material; and
tilted portions extending from the housing portions in a width direction of the sealing beam portions and tilted in a thickness direction of the sealing beam portions.

5. The fuel cell stack according to claim 1, wherein
each of the cell units further includes a holding member configured to hold the power generation cell,
a plurality of the power generation cells are arranged side by side in the holding member, and
the frame body is arranged to surround peripheries of the power generation cells.

6. The fuel cell stack according to claim 1, wherein the frame body includes a groove portion forming a communication hole between the frame body and the cell unit, the communication hole allowing the gas to flow therethrough.

7. The fuel cell stack according to claim 1, wherein each of the cell units further includes:
a current collection assisting layer configured to assist electrical connection between the power generation cell and the separator; and
a spring member provided between the current collection assisting layer and the separator and configured to press the separator against the power generation cell.

8. The fuel cell stack according to claim 7, wherein a thickness of the frame body is smaller than a total thickness of a thickness of the current collection assisting layer and a thickness of the spring member uncompressed.

9. The fuel cell stack according to claim 1, wherein the frame body includes an alignment portion provided on the outer peripheral side of the cell units as viewed in a stacking direction and configured to align the frame bodies adjacent to each other.

10. A fuel cell stack in which cell units are stacked one on top of another, each of the cell units including: a power generation cell including an electrolyte held between a pair of electrodes from opposite sides and configured to generate power by using supplied gas; and a separator defining and forming a flow passage portion, being a flow path of the gas, between the separator and the power generation cell, the fuel cell stack comprising:
a frame body having an insulating property and arranged between at least one set of the cell units adjacent to each other, wherein
the frame body includes,
as viewed in a stacking direction, outer peripheral beam portions provided to surround an outer peripheral side of a region in which the power generation cell is arranged,
a connection beam portion connecting the outer peripheral beam portions to each other, and
sealing beam portions formed along sealing portions at least partially sealing a manifold portion through which the gas is allowed to flow to the separator,
each of the cell units further includes:
a current collection assisting layer configured to assist electrical connection between the power generation cell and the separator; and
a spring member provided between the current collection assisting layer and the separator and configured to press the separator against the power generation cell.

* * * * *